(12) United States Patent
Kopacz et al.

(10) Patent No.: US 7,176,150 B2
(45) Date of Patent: Feb. 13, 2007

(54) INTERNALLY TUFTED LAMINATES

(75) Inventors: Thomas Joseph Kopacz, Omro, WI (US); Alan Edward Wright, Woodstock, GA (US); Teresa Marie Zander, Bonduel, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 75 days.

(21) Appl. No.: 10/021,867

(22) Filed: Dec. 17, 2001

(65) Prior Publication Data

US 2003/0073367 A1    Apr. 17, 2003

Related U.S. Application Data

(60) Provisional application No. 60/328,341, filed on Oct. 9, 2001.

(51) Int. Cl.
| | |
|---|---|
| B32B 3/02 | (2006.01) |
| D04H 11/00 | (2006.01) |
| D04H 13/00 | (2006.01) |
| D05C 17/00 | (2006.01) |
| D03D 27/00 | (2006.01) |

(52) U.S. Cl. ................ 442/381; 15/208; 15/209.1; 428/85; 428/92; 428/174; 442/384; 442/387; 442/389; 442/392

(58) Field of Classification Search ........... 442/381, 442/385, 400, 384, 387, 389, 392; 428/85, 428/86, 176, 181, 182, 183, 184, 92, 174; 604/384, 385.01, 370, 373, 374, 377; 15/208, 15/209.1

See application file for complete search history.

(56) References Cited

U.S. PATENT DOCUMENTS

| | | | |
|---|---|---|---|
| 2,957,512 A | 10/1960 | Wade | 154/33.05 |
| 3,316,136 A | 4/1967 | Pufahl | 156/160 |
| 3,644,157 A | 2/1972 | Draper | 156/160 |
| 3,676,242 A | 7/1972 | Prentice | 156/62.4 |
| 3,687,797 A | 8/1972 | Wideman | 161/129 |
| 3,692,618 A | 9/1972 | Dorschner et al. | |
| 3,849,241 A | 11/1974 | Butin et al. | 161/169 |
| 4,100,324 A | 7/1978 | Anderson et al. | 428/288 |
| 4,209,563 A | 6/1980 | Sisson | 428/288 |
| 4,323,534 A | 4/1982 | DesMarais | 264/176 R |
| 4,329,315 A | 5/1982 | Brower et al. | 264/555 |
| 4,333,782 A | 6/1982 | Pieniak | 156/164 |
| 4,340,563 A | 7/1982 | Appel et al. | 264/518 |
| 4,418,123 A | 11/1983 | Bunnelle et al. | 428/517 |
| 4,426,420 A | 1/1984 | Likhyani | 428/224 |
| 4,436,780 A | 3/1984 | Hotchkiss et al. | 428/198 |
| 4,543,099 A | 9/1985 | Bunnelle et al. | 604/385.24 |
| 4,548,856 A | 10/1985 | Ali Khan et al. | 428/171 |
| 4,555,811 A | 12/1985 | Shimalla | 2/51 |
| 4,600,620 A | 7/1986 | Lloyd et al. | 428/195.1 |
| 4,604,313 A | 8/1986 | McFarland et al. | 428/172 |
| 4,605,366 A | 8/1986 | Lehmann et al. | 425/143 |

(Continued)

FOREIGN PATENT DOCUMENTS

DE         29705157        12/1997

(Continued)

*Primary Examiner*—Terrel Morris
(74) *Attorney, Agent, or Firm*—Schwegman, Lundberg, Woessner, & Kluth, P.A.

(57) ABSTRACT

The present invention provides an internally-tufted laminate adapted to provide improved softness and cloth-like feel.

27 Claims, 12 Drawing Sheets

U.S. PATENT DOCUMENTS

| | | | | |
|---|---|---|---|---|
| 4,606,964 | A | 8/1986 | Wideman | 428/152 |
| 4,640,726 | A | 2/1987 | Sallee et al. | 156/85 |
| 4,657,802 | A | 4/1987 | Morman | 428/152 |
| 4,663,106 | A | 5/1987 | Pomplun et al. | 264/230 |
| 4,663,220 | A | 5/1987 | Wisneski et al. | 428/221 |
| 4,692,368 | A | 9/1987 | Taylor et al. | 428/137 |
| 4,720,415 | A | 1/1988 | Vander Wielen et al. | 428/152 |
| 4,741,941 | A | 5/1988 | Englebert et al. | 428/71 |
| 4,741,944 | A | 5/1988 | Jackson et al. | 428/152 |
| 4,741,949 | A | 5/1988 | Morman et al. | 428/224 |
| 4,781,966 | A | 11/1988 | Taylor | 428/152 |
| 4,786,353 | A | 11/1988 | Templeton et al. | 156/359 |
| 4,787,699 | A | 11/1988 | Moulin | 350/96.21 |
| 4,803,117 | A | 2/1989 | Daponte | 428/228 |
| 4,808,252 | A | 2/1989 | Lash | 156/73.1 |
| 4,849,049 | A | 7/1989 | Colton | 156/291 |
| 4,865,221 | A | 9/1989 | Jackson et al. | 221/48 |
| 4,883,549 | A | 11/1989 | Frost et al. | 156/161 |
| 4,908,247 | A | 3/1990 | Baird et al. | 428/34.9 |
| 4,910,064 | A | 3/1990 | Sabee | 428/113 |
| 4,996,091 | A | 2/1991 | McIntyre | 428/113 |
| 5,144,729 | A | 9/1992 | Austin et al. | 28/105 |
| 5,165,979 | A | 11/1992 | Watkins et al. | 428/113 |
| 5,180,620 | A | 1/1993 | Mende | 428/138 |
| 5,200,246 | A | 4/1993 | Sabee | 428/109 |
| 5,223,319 | A | 6/1993 | Cotton et al. | 428/131 |
| 5,232,533 | A | 8/1993 | Tani et al. | 156/181 |
| 5,324,800 | A | 6/1994 | Welborn, Jr. et al. | 526/160 |
| 5,350,624 | A | 9/1994 | Georger et al. | 428/219 |
| 5,385,775 | A | 1/1995 | Wright | 428/284 |
| 5,415,925 | A | 5/1995 | Austin et al. | 428/287 |
| 5,455,110 | A | 10/1995 | Connor | 428/286 |
| 5,498,463 | A | 3/1996 | McDowall et al. | 428/198 |
| 5,501,679 | A | 3/1996 | Krueger et al. | 604/393 |
| 5,508,102 | A | 4/1996 | Georger et al. | 428/297 |
| 5,520,308 | A | 5/1996 | Berg, Jr. et al. | 221/50 |
| 5,560,974 | A | 10/1996 | Langley | 428/198 |
| 5,575,874 | A | 11/1996 | Griesbach, III et al. | 156/167 |
| 5,616,408 | A | 4/1997 | Oleszczuk et al. | 442/346 |
| 5,618,610 | A | 4/1997 | Tomita et al. | 428/152 |
| D384,508 | S | 10/1997 | Zander et al. | D5/26 |
| 5,691,034 | A | 11/1997 | Kruegger et al. | 428/152 |
| 5,766,737 | A | 6/1998 | Willey et al. | 428/198 |
| 5,785,179 | A | 7/1998 | Buczwinski et al. | 206/494 |
| 5,789,065 | A | 8/1998 | Haffner et al. | 428/152 |
| 5,834,385 | A | 11/1998 | Blaney et al. | 442/382 |
| 5,910,224 | A | 6/1999 | Morman | 156/178 |
| 5,910,225 | A | 6/1999 | McAmish et al. | 156/229 |
| 5,962,112 | A | 10/1999 | Haynes et al. | 428/198 |
| D418,305 | S | 1/2000 | Zander et al. | D5/27 |
| 6,028,018 | A | 2/2000 | Amundson et al. | 442/381 |
| 6,039,906 | A | 3/2000 | Sageser et al. | 264/156 |
| 6,054,202 | A * | 4/2000 | Takeuchi et al. | 428/167 |
| 6,171,682 | B1 * | 1/2001 | Raidel et al. | 428/182 |
| 6,429,261 | B1 | 8/2002 | Lang et al. | 525/191 |
| 6,610,173 | B1 * | 8/2003 | Lindsay et al. | 162/109 |
| 6,716,441 | B1 * | 4/2004 | Osborne et al. | 424/404 |
| 6,808,791 | B2 * | 10/2004 | Curro et al. | 428/198 |
| 6,811,638 | B2 | 11/2004 | Close et al. | |
| 2001/0009711 | A1 * | 7/2001 | Latimer et al. | 428/182 |
| 2002/0127937 | A1 * | 9/2002 | Lange et al. | 442/328 |
| 2005/0051276 | A1 | 3/2005 | Close et al. | |

FOREIGN PATENT DOCUMENTS

| | | |
|---|---|---|
| EP | 0006647 | 7/1983 |
| EP | 0096546 | 5/1987 |
| EP | 0130764 | 1/1988 |
| EP | 0302382 | 2/1989 |
| EP | 343304 A2 * | 11/1989 |
| EP | 0415758 | 3/1991 |
| EP | 0456044 | 11/1991 |
| EP | 0286538 | 1/1992 |
| EP | 0371802 | 11/1992 |
| EP | 0371804 | 3/1993 |
| EP | 0218473 | 7/1993 |
| EP | 0291211 | 7/1993 |
| EP | 0410937 | 12/1993 |
| EP | 0575123 | 12/1993 |
| EP | 0605831 | 7/1994 |
| EP | 0343978 | 11/1994 |
| EP | 0500590 | 7/1995 |
| EP | 0606234 | 10/1995 |
| EP | 0606235 | 10/1995 |
| EP | 0606242 | 12/1995 |
| EP | 0544156 | 6/1996 |
| EP | 0699163 | 1/1997 |
| EP | 0713546 | 3/1997 |
| EP | 0715661 | 10/1997 |
| EP | 0644130 | 5/1998 |
| EP | 0714254 | 5/1998 |
| EP | 0747313 | 5/1998 |
| EP | 0857453 | 8/1998 |
| EP | 865755 A1 * | 9/1998 |
| EP | 0546837 | 11/1998 |
| EP | 0875609 | 11/1998 |
| EP | 0879575 | 11/1998 |
| EP | 0714351 | 12/1998 |
| EP | 0712304 | 4/1999 |
| EP | 0955247 | 11/1999 |
| EP | 0955260 | 11/1999 |
| EP | 0970909 | 1/2000 |
| EP | 0978247 | 2/2000 |
| EP | 0980841 | 2/2000 |
| EP | 0983739 | 3/2000 |
| EP | 0983740 | 3/2000 |
| EP | 0670385 | 4/2000 |
| EP | 0748748 | 5/2000 |
| EP | 1000577 | 5/2000 |
| EP | 1002746 | 5/2000 |
| EP | 1044894 | 10/2000 |
| EP | 1090868 | 4/2001 |
| EP | 986322 | 12/2001 |
| GB | 2130965 | 6/1984 |
| GB | 2106862 | 4/1985 |
| WO | WO-93/15248 | 8/1993 |
| WO | WO-94/12699 | 6/1994 |
| WO | WO-94/28219 | 12/1994 |
| WO | WO-95/03171 | 2/1995 |
| WO | WO 9600625 A2 * | 1/1996 |
| WO | WO-96/16216 | 5/1996 |
| WO | WO-96/21475 | 7/1996 |
| WO | WO-96/26664 | 9/1996 |
| WO | WO-97/23677 | 7/1997 |
| WO | WO-97/43938 | 11/1997 |
| WO | 98/03713 | 1/1998 |
| WO | WO-98/06640 | 2/1998 |
| WO | 98/16678 | 4/1998 |
| WO | WO-98/23519 | 6/1998 |
| WO | WO-98/29018 | 7/1998 |
| WO | WO-98/52453 | 11/1998 |
| WO | WO-98/52454 | 11/1998 |
| WO | 99/24551 | 5/1999 |
| WO | 00/38565 | 7/2000 |
| WO | 00/38911 | 7/2000 |
| WO | 00/38912 | 7/2000 |
| WO | 00/38913 | 7/2000 |
| WO | 00/48834 | 8/2000 |
| WO | WO-01/00917 | 1/2001 |

* cited by examiner

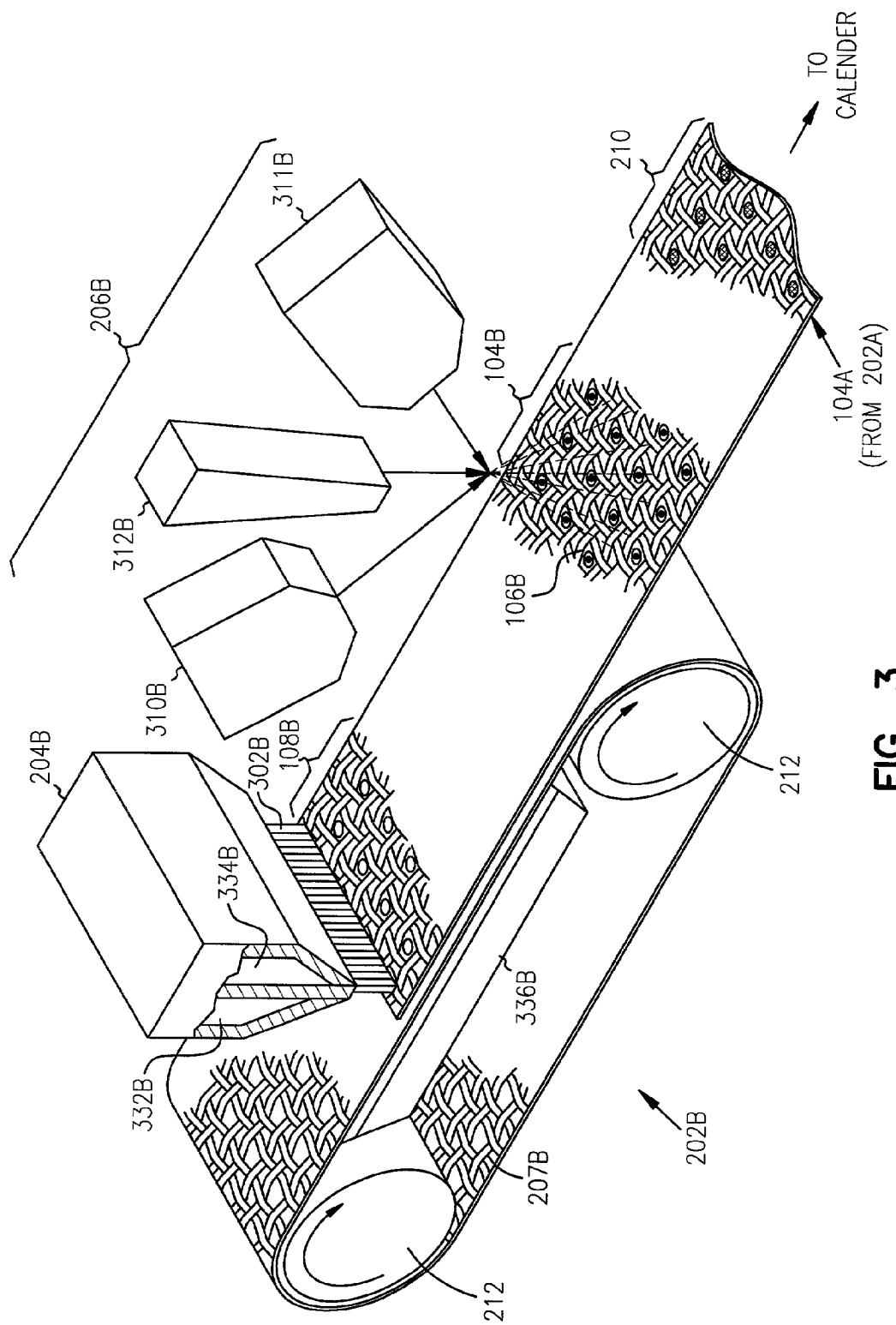

INTERNALLY TUFTED LAMINATES

This application claims the benefit under 35 U.S.C. 119 (e) of U.S. Provisional Application Ser. No. 60/328,341, entitled, "Internally Tufted Laminates and Methods of Producing Same," filed on Oct. 9, 2001, hereby incorporated by reference in its entirety.

BACKGROUND

Fibrous nonwoven materials and fibrous nonwoven composite materials are widely used as products, or as components of products, such as wet wipes, because they can be manufactured inexpensively and made to have specific characteristics. Since these products can be manufactured so inexpensively, they are typically viewed as disposable, as opposed to reusable.

One approach to making fibrous nonwoven composite materials involves the use of homogeneous mixtures of materials such as air laid webs of fibers mixed with cellulosic fibers or another absorbent material. Other types are prepared by joining different nonwoven materials in a laminate or formed as a layered structure. These products can be prepared from plastic materials such as plastic sheets, films and nonwoven webs, prepared by extrusion processes such as, for example, slot film extrusion, blown bubble film extrusion, meltblowing of nonwoven webs and spunbonding.

Non-woven materials that are useful as wet wipes should meet minimum product standards for strength, moisture level, size, flexibility, thickness, softness and texture. However, with respect to personal care wet wipe products in particular, there is an increasing consumer preference for materials that meet even higher softness and texture standards, such that they approach a cloth-like feel.

Some attempts to produce such materials have resulted in products with tufts on their outer surfaces. However, such products have generally met with consumer resistance, particularly in personal care products, as the resulting male-female tuft orientation provides an unacceptably rough surface. Attempts to place tufts on the outside of only one side, so as to eliminate roughness on that side, has only caused confusion as to which side is intended for use.

What is needed, therefore, is a new nonwoven laminate that is soft and cloth-like, yet is easy to use and relatively inexpensive to produce.

SUMMARY

The present invention provides a nonwoven laminate comprising a layer of tufted material located between at least two outer layers of non-woven material. The present invention also provides a nonwoven laminate comprising at least two layers of tufted material oriented to produce an inner tufted laminate. In one aspect, each tufted layer has a bi-layer structure that includes an outer layer of nonwoven composite material in addition to the inner tufted layer. In one aspect, the inner tufted layer is comprised primarily of polymer fibers. The nonwoven composite layer can be comprised of absorbent fibers and microfibers, and in one aspect is standard coform.

The inner tufted layer has tufts, depressions and valleys. The depressions can be visible on the outside surface of the laminate. Generally, the tufts are not visible on the outside surface, but the invention is not so limited. Furthermore, the visibility of the tufts may ultimately depend on the opacity of the layer(s) of the laminate and/or laminate configuration.

The depressions may also function to separate and remove particles (e.g. fecal matter) from a target surface during wiping applications. The tufts can add wet resiliency and bulk to the sheet and can form a core layer of larger pores, which it is believed can facilitate solution migration to the surface, thus enhancing wetness perception. Since the tufts are oriented to the inside in this invention, contrary to conventional practice, it is referred to herein as an "internally-tufted" (IT) laminate.

In one aspect, the IT laminate is produced using two web formers, each having a polymer die or fiber bank and a nonwoven material bank. Each polymer tufted layer is created by forcing polymer fibers through a porous forming surface, such as a wire, with vacuum assistance. This method of formation creates a vacuum formed tufted layer on the wire side with the wire image visible on the opposite side. In this way, the resulting top layer generally conforms to the contour and topography of the porous forming surface. The nonwoven layer is then added on top of the polymer layer surface generally conforming itself to the porous forming surface pattern. In this way, the resulting layer generally mirrors the contour and topography of the porous forming surface. The nonwoven layer is then added on top of the polymer tufted layer. The resulting bi-layer structure is laminated to an identical bi-layer structure as described above, with the polymer tufted layers to the inside. The product can further be bonded in any manner desired.

The IT laminate is useful in many products, including, but not limited to, disposable diapers, tissues, towels, wet or dry wipes, and so forth. In one aspect, the present invention comprises a wetting liquid or solution combined with the internally tufted laminate.

The present invention further comprises a kit having at least one wetted tufted laminate product therein and instructions for using the laminate. The kit can include any variety of conventional wipe containers, or one as seen in U.S. Ser. No. 09/870,785 filed May 31, 2001, entitled "Flexible Orifice for Wet Wipes Dispensers" or U.S. Ser. No. 09/871,019 filed May 31, 2001, entitled "Stack of Fan Folded Material and Combinations thereof," both of which are incorporated herein by reference.

BRIEF DESCRIPTION OF THE DRAWINGS

FIG. 3 is a perspective schematic view of one of the webformers used in the process shown in FIG. 2 in one aspect of the present invention.

DETAILED DESCRIPTION

Figure 1A:
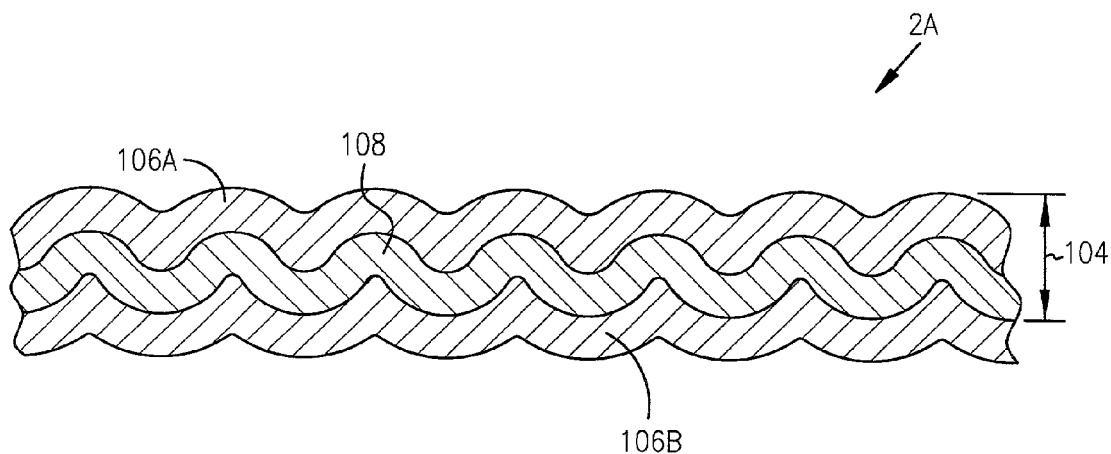
FIG. 1A is a simplified side view of an internally tufted (IT) laminate material in one aspect of the present invention.

In the following detailed description of the preferred aspects, reference is made to the accompanying drawings, which form a part hereof, and in which is shown by way of illustration specific preferred aspects in which the invention may be practiced. These aspects are described in sufficient detail to enable those skilled in the art to practice the invention, and it is to be understood that other aspects may be utilized and that chemical, mechanical, procedural and other changes may be made without departing from the spirit and scope of the present invention. The following detailed description is, therefore, not to be taken in a limiting sense, and the scope of the present invention is defined only by the appended claims, along with the full scope of equivalents to which such claims are entitled.

The present invention provides a nonwoven tufted laminate adapted to provide improved softness and cloth-like feel and methods for making such laminates. The laminate includes at least two layers bonded together with one or more tufted layers oriented towards the inside. The resulting product provides softness and flexibility while maintaining adequate strength, integrity and resiliency, particularly when wetted. The present invention also provides tufted laminate wet wipes for various uses.

Various definitions used throughout the specification are provided first, followed by a description of the aspects.

Definitions

As used herein, the term "nonwoven web" means a structure or a web of material that has been formed without use of traditional fabric forming processes, such as weaving or knitting, to produce a structure of individual fibers or threads that are intermeshed, but not in an identifiable, repeating manner. Non-woven webs have been, in the past, formed by a variety of conventional processes such as, for example, meltblowing processes, spunbonding processes, film aperturing processes and staple fiber carding processes.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which can be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin (hereinafter "Butin").

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spunbonding mechanisms. The production of spun-bonded nonwoven webs is illustrated in patents such as, for example, in U.S. Pat. No. 4,340,563 to Appel et al., and U.S. Pat. No. 3,692,618 to Dorschner et al.

As used herein, the term "coform" means a nonwoven composite material of air-formed matrix material comprising thermoplastic polymeric meltblown fibers such as, for example, microfibers having an average fiber diameter of less than about 10 microns, and a multiplicity of individualized absorbent fibers such as, for example, wood pulp fibers disposed throughout the matrix of polymer microfibers and engaging at least some of the microfibers to space the microfibers apart from each other. The absorbent fibers are interconnected by and held captive within the matrix of microfibers by mechanical entanglement of the microfibers with the absorbent fibers, the mechanical entanglement and interconnection of the microfibers and absorbent fibers alone form a coherent integrated fibrous structure. The coherent integrated fibrous structure can be formed by the microfibers and wood pulp fibers without any adhesive, molecular or hydrogen bonds between the two different types of fibers. The absorbent fibers are preferably distributed uniformly throughout the matrix of microfibers to provide a homogeneous material. These materials are prepared according to the descriptions in U.S. Pat. No. 4,100,324 to Anderson et al. ("Anderson"), U.S. Pat. No. 5,508,102 to Georger et al. ("Georger") and U.S. Pat. No. 5,385,775 to Wright ("Wright"), all assigned to the same Assignee as in the present invention.

As used herein, the term "microfibers" means small diameter fibers having an average diameter not greater than about 100 microns, for example, having an average diameter of from about 0.5 microns to about 50 microns, or more particularly, microfibers may have an average diameter of from about four (4) microns to about 40 microns.

As used herein, the term "autogenous bonding" means bonding provided by fusion and/or self-adhesion of fibers and/or filaments without an applied external adhesive or bonding agent. Autogenous bonding can be provided by contact between fibers and/or filaments while at least a portion of the fibers and/or filaments are semi-molten or tacky. Autogenous bonding may also be provided by blending a tackifying resin with the thermoplastic polymers used to form the fibers and/or filaments. Fibers and/or filaments formed from such a blend can be adapted to self-bond with or without the application of pressure and/or heat. Solvents may also be used to cause fusion of fibers and filaments, which remains after the solvent is removed.

As used herein, the term "machine direction (MD)" refers to the direction of travel of the forming surface onto which fibers are deposited during formation of a nonwoven fibrous web.

As used herein, the term "cross-machine direction (CD)" refers to the direction, which is essentially perpendicular to the machine direction defined above.

As used herein, the term "tensile strength" refers to the maximum load or force (i.e., peak load) encountered while elongating the sample to break. Measurements of peak load are made in the machine and cross-machine directions using wet samples.

As used herein, the term "wet wipe" refers to a fibrous sheet that has a liquid applied thereto during manufacture. The amount of liquid or solution contained within each wet wipe can vary depending upon the type of material being used to provide the wet wipe, the type of liquid being used, the type of container being used to store the stack of wet wipes, and the desired end use of the wet wipe. Generally, each wet wipe can contain from about 25 to about 600 weight percent or from about 200 to about 400 weight percent liquid based on the dry weight of the wipe, for improved wiping in certain situations. To determine the liquid add-on, first the weight of a just-manufactured dry wipe is determined. Then, the amount of liquid by weight equal to the weight of the just-manufactured dry wipe, or an increased amount of liquid measured as a percent add-on based on the weight of the just-manufactured dry wipe, is added to the wipe to make it moistened, and then known as a "wet wipe" or "wet wipes". The liquid may include a fragrance and/or an emollient and may serve to aid the fibrous sheet in retention of materials, which are to be wiped up during its utilization.

As used herein, the term "thermal point bonding" involves passing a material such as two or more webs of fibers to be bonded between a heated calendar roll and an anvil roll. The calender roll is usually, though not always, patterned in some way so that the entire fabric is not bonded across its entire surface, and the anvil roll is usually flat. As a result, various patterns for calender rolls have been developed for functional as well as aesthetic reasons.

As used herein the term "super absorbent" refers to a "water-swellable," substantially insoluble organic or inorganic material capable of absorbing at least ten (10) times its weight of an aqueous solution containing 0.9 wt % of sodium chloride.

As used herein the term "palindromic" means a multilayer laminate, for example a reverse-tufted laminate, which is substantially symmetrical. Examples of palindromic laminates could have layer configurations of A/B/A, A/B/B/A, A/A/B/B/A/A, A/B/C/B/A, and the like. Examples of non-palindromic layer configurations would include A/B/C, A/B/C/A, A/B/C/D, etc.

As used herein the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the terms "basis weight and density" are defined as follows: The "basis weight" (in grams per square meter, $g/m^2$ or gsm) is calculated by dividing the dry weight by the area (in square meters). The "density" of the wet-wipe, as used herein, is a "wet density" and is calculated as the basis weight (in grams per square meter, $g/m^2$ or gsm) divided by the thickness of the wet-wipe after wetting with the solution. The wet thickness is employed so as to represent the product as obtained by a consumer. Dry basis weight is used to accurately assess the wet density by elimination of variability caused by the amount of solution on the wet-wipes. The wet-wipes are removed from their container and randomly selected. Each wipe is unfolded, numbered and measured (length and width). The wipes are stacked and compressed to about 15–20 metric tons in a press for about 10 seconds. This step is repeated until a steady stream of solution is no longer observed. The wipes are draped over a rod and placed in a drying oven at 105±2° C. for about 2 hours. The dry wipes are allowed to cool for about 14–15 minutes and weighed to ±0.01 g.

As used herein, the term "cup crush" refers to one measure of the softness of a nonwoven fabric sheet that is determined according to the "cup crush" test. The test is generally performed as discussed in detail in U.S. patent application Ser. No. 09/751,329 entitled, "Composite Material With Cloth-Like Feel" filed Dec. 29, 2000. The cup crush test evaluates fabric stiffness by measuring the peak load (also called the "cup crush load" or just "cup crush") required for a 4.5 cm diameter hemispherically shaped foot to crush a 17.8 cm by 17.8 cm piece of fabric shaped into an approximately 6.5 cm diameter by 6.5 cm tall cup shape, while the now cup shaped fabric is surrounded by an approximately 6.5 cm diameter cylinder cup to maintain a uniform deformation of the cup shaped fabric. There can be gaps between a ring (not shown) and the forming cup, but at least four corners of the fabric must be fixedly pinched therebetween. The foot and cylinder cup are aligned to avoid contract between the cup walls and the foot that could affect the readings. The load is measured in grams, and recorded a minimum of twenty times per second while the foot is descending at a rate of about 406 mm per minute. The cup crush test provides a value for the total energy required to crush a sample (the "cup crush energy") which is the energy over a 4.5 cm range beginning about 0.5 cm below the top of the fabric cup, i.e., the area under the curve formed by the load in grams on one axis and the distance the foot travels in millimeters on the other. Cup crush energy is reported in gm-mm (or inch-pounds). A lower cup crush value indicates a softer material. A suitable device for measuring cup crush is a model FTD-G-500 load cell (500 gram range) available from the Schaevitz Company, Pennsauken, N.J.

As used herein, the term "tensile test" refers to a peak load tensile test that is a measure of breaking strength and elongation or strain of a fabric when subjected to unidirectional stress. This test is known in the art and is similar to ASTM-1117-80, section seven, which uses a 12-inch per minute strain rate. The results are expressed in grams to break and percent stretch before breakage. Higher numbers indicate a stronger, more stretchable fabric. The term "load" means the maximum load or force, expressed in units of weight, required to break or rupture the specimen in a tensile test. The term "strain" or "total energy" means the total energy under a load versus elongation curve as expressed in weight-length units. The term "elongation" means the increase in length of a specimen during a tensile test and is given in percent. Values for tensile strength and elongation are obtained using a specified width of fabric, in this case one (1) inch (25.4 mm), clamp width and a constant rate of extension. The test is conducted using wet product as would be representative of consumer use. Fabric testing can be conducted in both the machine direction (MD) and cross-machine direction (CD), which can be determined by one familiar with nonwoven materials by the orientation of the fibers. It is important that the samples be either parallel or perpendicular to the machine direction to insure accuracy. The test is conducted using a clamp approximately two (2) inches (50.8 mm) in width, with one smooth face and one 0.25 inch round horizontal rod comprising each clamp mechanism. The specimen is clamped in, for example, an Instron Model™, available from the Instron Corporation, Canton, Mass., or a Thwing-Albert Model INTELLECT II available from the Thwing-Albert Instrument Co., Philadelphia, Pa., which have parallel clamps approximately three (3) in (76 mm) in length. This closely simulates fabric stress conditions in actual use.

As used herein, the term "bulk" refers to the thickness of a laminate. This thickness is measured at 0.05 psi with a Starret-type bulk tester, in units of millimeters using a 7.62 cm (3 in) diameter platen. This test is conducted on the finished wet-wipe product and care must be taken to insure the platen does not fall on a fold or wrinkle that has resulted from packaging.

DESCRIPTION

One aspect of the invention is directed to an IT laminate fabric having at least one layer of tufts internal to an end laminate, e.g., tufted layer against at least one other layer. The various layers can be formed together nearly simultaneously or in subsequent forming or laminating steps. As shown in FIG. 1A, the IT laminate fabric 2A can comprise a bi-layer 104 comprising a first outer nonwoven layer 106A laminated to a first side of a polymeric tufted layer 108. The IT laminate fabric 2A can further comprise a second nonwoven layer 106B laminated to a second side of the polymeric tufted layer 108 such that the tuft layer 108 is an internal layer located between the two outer layers 106A and 106B. Layers 106A, 108 and 106B can be formed together near simultaneously or in subsequent forming or laminating steps.

Figure 1B:
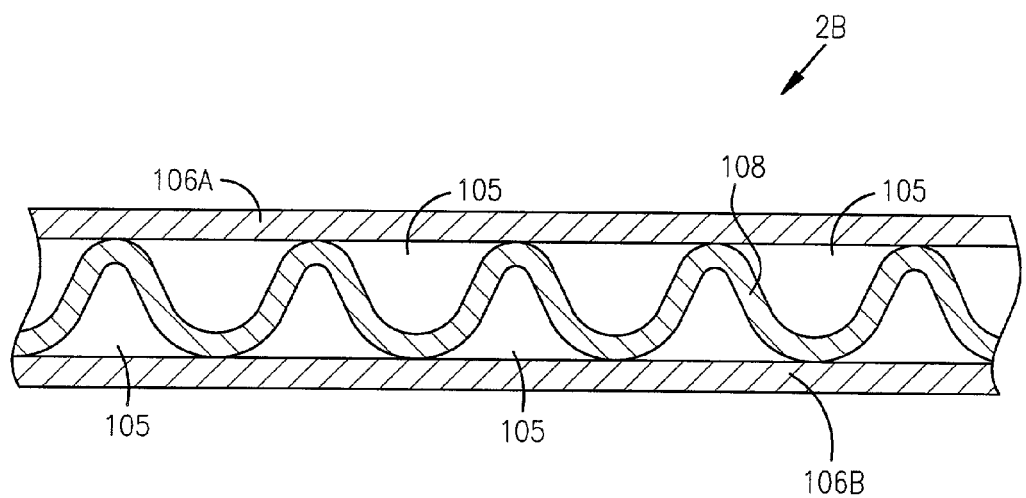
FIG. 1B is a simplified side view of an alternative internally tufted (IT) laminate material in one aspect of the present invention.

FIG. 1B also is directed to an IT laminate fabric 2B having at least one layer of tufts internal to an end laminate, but in this aspect, the layers (106A, 108, and 106B) are each formed separately and then laminated together. It should also be understood that any adjacent two layers 106A, 108 and 106B can be formed together and then the third layer formed or laminated to the other two layers. For example, one can form layers 106A and 108 near simultaneously and then subsequently form or laminate 106B to 108 or one can form layers 106B and 108 near simultaneously and then subsequently form or laminate 106A to 108.

Figure 1C:
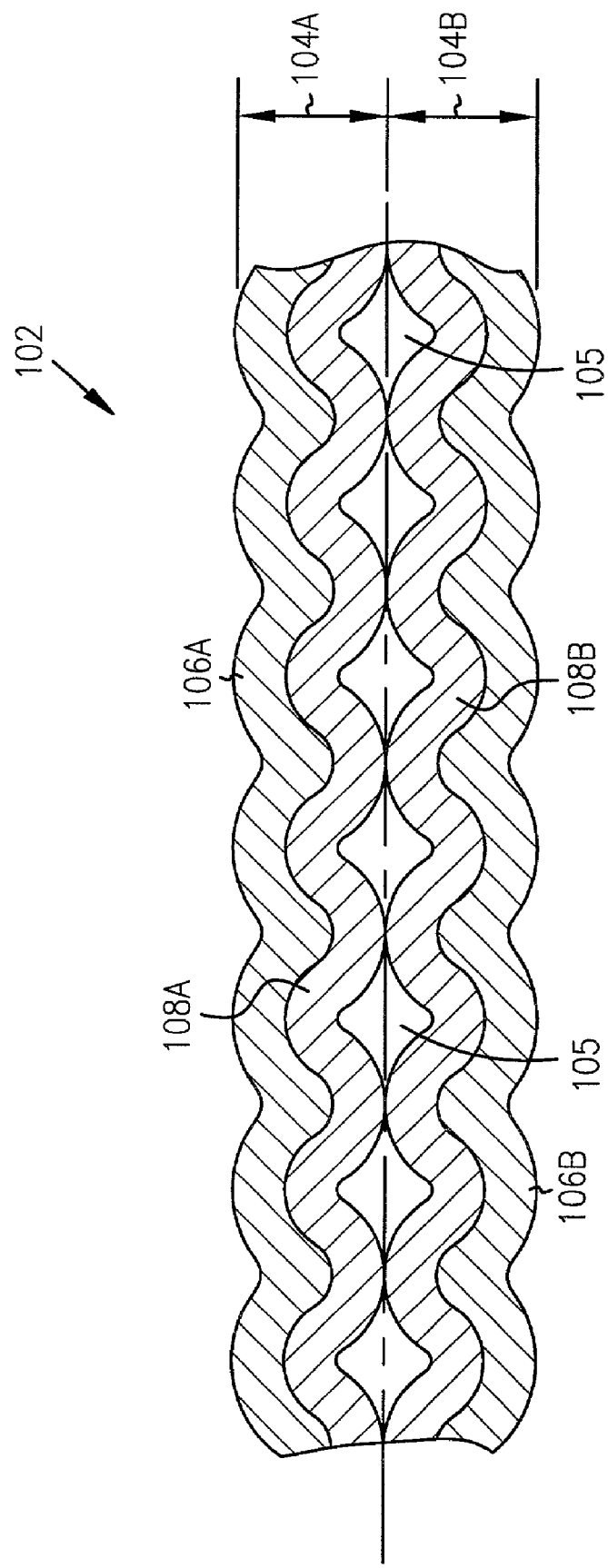
FIG. 1C is a simplified side view of another alternative internally tufted (IT) laminate material in one aspect of the present invention.

Another aspect of the invention is directed to at least two layers of tufted material with the tufts oriented towards each other to form an internally tufted laminate. In particular embodiments, outer layers of absorbent material, such as coform, etc., can be added one layer at a time, as desired for a particular application. One example of such an aspect is shown in FIG. 1C. In this aspect, the IT laminate fabric 102 comprises first and second bi-layers, 104A and 104B, laminated together. Each bi-layer comprises a nonwoven layer, 106A and 106B, respectively, and a polymeric tufted layer, 108A and 108B, respectively. The bi-layers 104A and 104B are arranged with their respective first and second polymer tufted layers 108A and 108B oriented inwardly, such that the first and second nonwoven layers 106A and 106B, respectively, are the outermost layers of the fabric 102.

Bonding of the first and second bi-layers 104A and 104B in this aspect can occur at various bonding points as needed for a particular application. In one embodiment, only a few points are bonded and this can be controlled by the embossing pattern used, discussed herein.

As seen best in FIGS. 1B and 1C, though possible with the various aspects of the invention, void volume or pockets 105 can be formed between the layer(s) of the IT laminate. The formation of such void volume 105 occurs when one layer does not completely fill in the valleys of the adjacent layer, and instead a portion of one layer spans across raised portions or peaks of the adjacent layer. The pockets or void volume 105 can be formed between layers 106A and 108 of FIGS. 1A (not shown) or FIGS. 1B, or layers 106A and 108A of FIGS. 1C (not shown) for example. Pockets 105 can, alternatively or additionally, be formed between layers 106B and 108 of FIG. 1A (not shown) or FIG. 1B, or layers 106B and 108 of FIG. 1C (not shown). Still alternatively or additionally, void volume 105 can be formed between layers 108A and 108B of FIG. 1C, or any adjacent layers of the IT laminate. Such void volume or pockets can add bulk to the laminate without increasing the basis weight for a given quantity of laminate material. The void volume or pockets can provide this and/or other features as discussed below.

Any synthetic or natural cellulosic material can be used for the nonwoven layers 106A and 106B, including, but not limited to, spunbonded webs, meltblown webs, air laid layer webs, bonded carded webs, hydroentangled webs, wet-formed web, and any combination thereof. Each nonwoven layer, 106A and 106B, can be a composite material made of a mixture of two or more different fibers or a mixture of fibers and particulates. Such mixtures can be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly referred to as super absorbent materials, occurs prior to collection of the meltblown, fibers upon a collecting device to form a coherent web of randomly dispersed meltblown fibers and other materials such as disclosed in Anderson, supra.

In one aspect, each nonwoven layer 106A and 106B is made of pulp fibers, including wood pulp fibers, to form a material such as, for example, a tissue layer. Additionally, the layers 106A and 106B can be layers of hydraulically entangled fibers such as, for example, hydraulically entangled mixtures of wood pulp and staple fibers such as disclosed in U.S. Pat. No. 4,781,966 to Taylor ("Taylor").

In one aspect, coform, as defined herein, is used for each nonwoven layer 106A and 106B. In particular aspects, the coform has between about 20 and 50 weight (wt) % of polymer fibers and between about 50 and 80 wt % of pulp fibers. Such proportions provide for adequate balance of strength, absorbency, and acceptable Tinting characteristics for many laminate uses. In one aspect, the ratio is about 25 to 40 wt % polymer fibers to about 60 to 75 wt % pulp fibers. In another aspect, the ratio of is about 30 to 40 wt % polymer fibers and about 60 to 70 wt % pulp fibers. In yet another aspect, the ratio is approximately 35 wt % polymer fibers to approximately 65 wt % pulp fibers.

Fibers of diverse natural origin are also applicable to the invention. Digested cellulose fibers from softwood (derived from coniferous trees), hardwood (derived from deciduous trees) or cotton linters can be utilized in the nonwoven layers 108. Fibers from Esparto grass, kemp, flax, and other ligneous and cellulose fiber sources may also be utilized as raw material in the invention. A commercial example of such a wood pulp material known as CF-405 is available from Weyerhaeuser Corp. of Tacoma, Wash.

Any thermoplastic polymer known in the art can be used in the layers 106A, 106B, 108A and 108B. In one aspect, polyolefin materials are used, including, but not limited to, polyethylene, polypropylene and polybutylene, which is considered to include ethylene copolymers, propylene copolymers and butylene copolymers thereof, and so forth, including mixtures and blends thereof. Use of polypropylene can provide advantages for wire release and resiliency. A particularly useful polypropylene is PF-105 made by Basell North America Co. of Wilmington, Del. Additional polymers suitable for use in the present invention are disclosed in Wright, supra.

Figure 2:
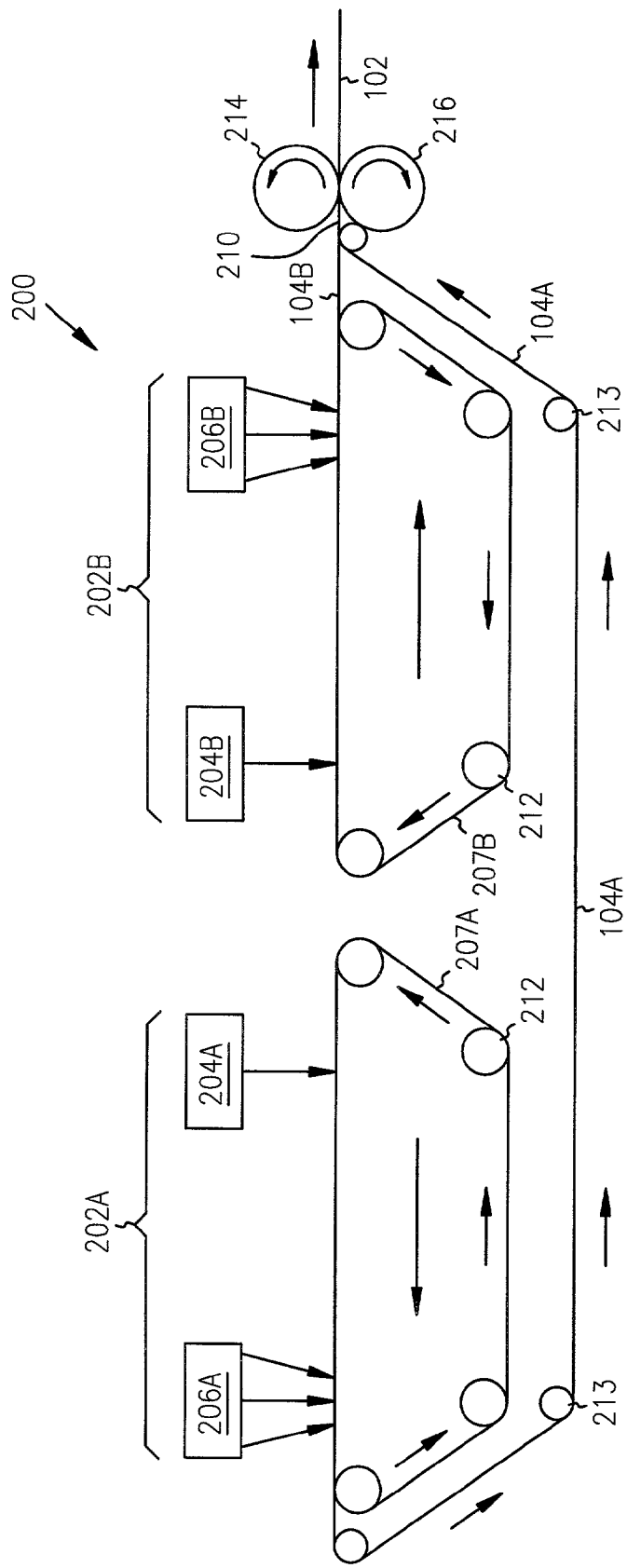
FIG. 2 is a schematic illustration of an exemplary process for forming an IT laminate material in one aspect of the present invention.

The IT laminate fabric 102 can be produced in any suitable manner. In the aspect shown in FIG. 2, a duel-web forming machine 200 is used to prepare an IT laminate web 210 that is then bonded to form the IT laminate fabric 102. The duel-web forming machine 200 is comprised of a first webformer 202A and a second webformer 202B. Each webformer 202A and 202B possesses a polymer die or bank, 204A and 204B, respectively, and a nonwoven material bank, 206A and 206B, respectively. The various banks deposit material on forming surfaces 207A and 207B that are endless belts disposed around any number of support rollers 212. In order to achieve the desired material configuration, the webformers 202A and 202B travel in opposite directions as shown. The first web-former 202A produces the first bi-layer 104A and the second webformer produces the second bi-layer 104B (described in FIG. 1B). The first bi-layer 104A is guided by any number of first bi-layer rollers 213. The combined bi-layers, 104A and 104B, form the IT laminate web 210 when joined together. These bi-layers can be joined together by any suitable means such as, including, but not limited to, thermal bonding, autogenous bonding, ultrasonic welding, and so forth, as is known in the art. In the aspect shown in FIG. 2, the IT laminate web 210 enters a conventional horizontal calender system having a patterned calender roller 214 and a smooth anvil roller 216 where the layers are point bonded to form the IT laminate 102. Conventional drive means, e.g., electric motors, and other conventional devices that can be utilized in conjunction with the apparatus of FIG. 2 are well known and not discussed in detail herein.

Figure 10:
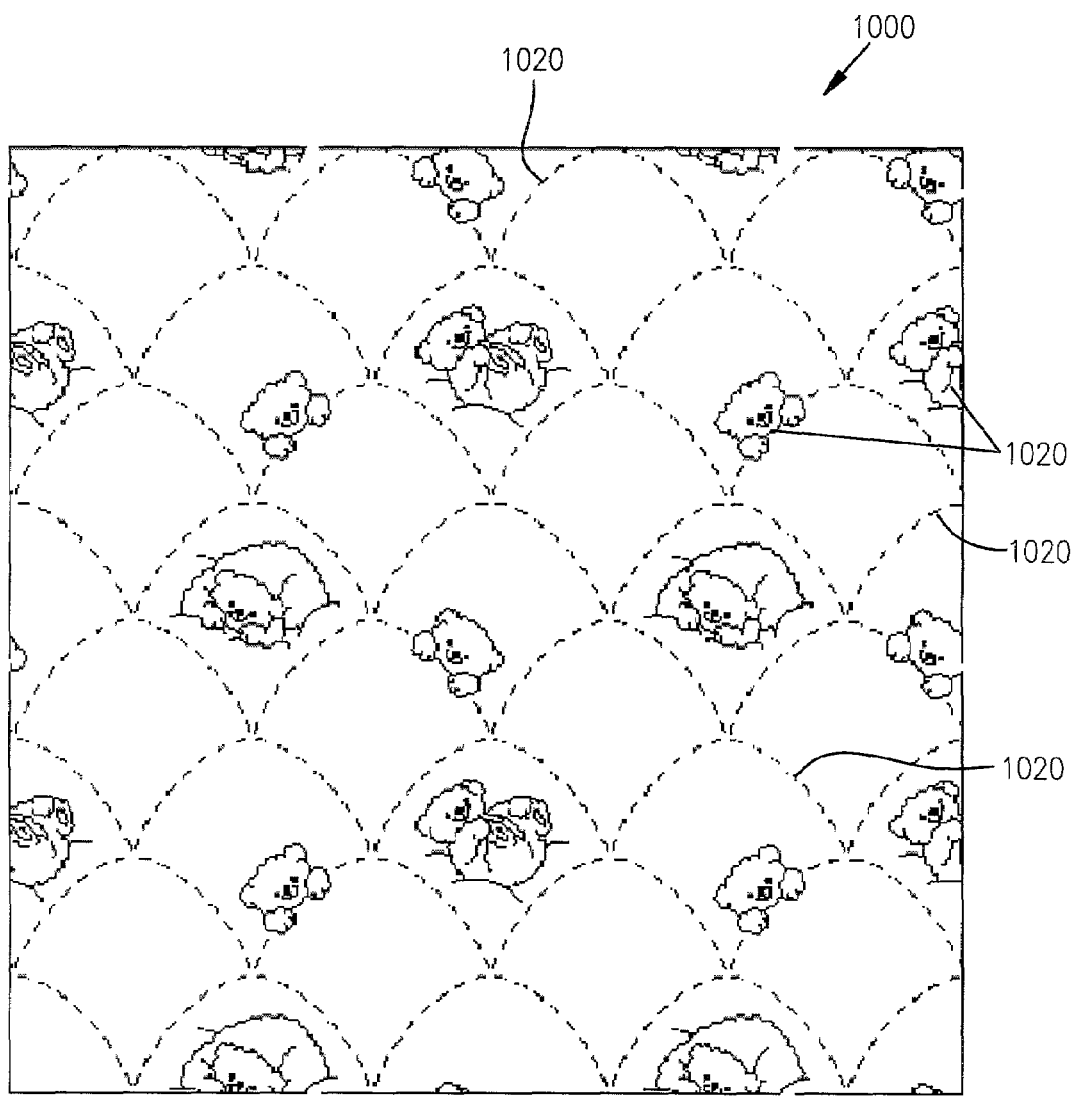
FIG. 10 is a plan view of a bonding pattern suitable for the IT material in one aspect of the present invention.

The calender roller can have from about one (1)% to 30% embossing pin bond area. In one aspect, the embossing pin bond area is between about 9% and 11%. Both the anvil and patterned rollers can be heated to provide thermal point bonding as described below. One or both of the smooth anvil roller and the calender roller can be heated and the pressure between these two rollers can be adjusted by well-known structures to provide the desired temperature, if any, and bonding pressure to join the two layers. As can be appreciated, the bonding between the two layers is a point bonding. Various bonding patterns can be used, depending upon the desired tactile properties of the final composite laminate material. The bonding points are preferably evenly distributed over the bonding area of the composite material. One example of a bonding pattern is shown in FIG. 10. It should be noted that the positions of the calender roller 214 and anvil roller 216 in FIG. 2 are illustrative only and can be reversed.

With regard to thermal bonding, one skilled in the art will appreciate that the temperature to which the materials, or at least the bond sites thereof, are heated for heat-bonding will depend not only on the temperature of the heated roller(s) or other heat sources but on the residence time of the materials on the heated surfaces, the compositions of the materials, the basis weights of the materials and their specific heats and thermal conductivities. Typically, the bonding for polypropylene, for example, can be conducted at a temperature of from about 200° F. to about 22020 F. The typical pressure range on the rollers, for polypropylene, for example, can be from about 60 pli (pounds per linear inch) to about 80 pli, but the actual pressure used ultimately depends on the particular application.

It should also be appreciated that any number of layers can comprise the IT laminate material. Furthermore, each layer does not necessarily need to be a "bi-layer" but can comprise one or more layers. Alternately, each layer can essentially be a single layer formed in a single step, rather than in stages, as shown in FIG. 2. In one aspect, the final product is a palindromic laminate as defined herein. In one embodiment there is an additional elastic or non-elastic layer located adjacent to or between the tufted layer(s) and any adjacent layer.

FIG. 3 is a schematic perspective view of the second webformer 202B. As shown, the polymer die 204B provides molten filaments 302B for the polymer tufted layer 108B. The tufts provide resiliency to the laminate, such as separating the two outer surfaces of the laminate from each other. In one aspect, the polymer tufted layer 108B contains polymer only, with no added pulp. In another aspect, there is pulp added to the polymer layer 108B. However, it may be desirable to limit the amount of added pulp, so as to not adversely affect the desired resiliency. In one embodiment, the polymer layer 108B comprises at least about 75% polymer and no more than about 25% added other material, such as pulp. In one aspect, layers 108A and 108B are meltblown polymeric layers. In another aspect, the polymeric layers are formed by other means, including, but not limited to, cast film, formed filaments, and so forth.

Filaments 302B can be contacted by air in conduits 332B and 334B as in the process described in Butin, supra. See also U.S. Pat. No. 4,741,941 to Englebert et al., also assigned to the same Assignee as the present invention. The filaments 302B are ejected from the die 204B and collected on the forming surface 207B to form the polymer tufted layer 108B. Suction box 336B applies a vacuum to the randomly entangled filaments, which results in a pressure differential forming pockets that produce hollow projections or tufts from the undersurface of the web.

Forming means for the tufts can be any porous surface through which a thermoplastic polymer and air can be drawn, e.g., forming wire, perforated plates, perforated drum, and so forth. See also, for example, Englebert, supra. Again, the tufts can be formed by a variety of methods, including, but not limited to, meltblown (polymer), cast film, formed filaments, spunbond, bonded-carded web, and so forth. See also, for example, Englebert, supra. In one aspect of the invention, the tufts forming the tufted layer(s) are protrusions or projections that measure a certain length or height, as discussed in more detail in FIG. 5.

The forming surface 207B can be any type of belt or wire, such as a highly permeable wire. Wire geometry and processing conditions may be used to alter the tufts of the material. The particular choice will depend on the desired tuft size, shape, depth, surface density (tufts/area), and the like. One skilled in the art could easily determine without undue experimentation the judicious balance of attenuating air and below-wire-vacuum required to achieve the desired tuft dimensions and properties. Generally, however, since a wire may be used to provide the actual tufts, it is important to use a highly permeable wire to allow material to be drawn through the wire to form the tufts. In one aspect, the wire can have an open area of between about 40% and about 60%, more particularly about 45% to about 55%, and more particularly about 49% to about 51%. This is as compared with prior art nonwoven wires that are very dense and closed, having open areas less than about 40%, since primarily only air is pulled through the wire for the purpose of helping to hold the nonwoven material being formed on the wire.

Figure 4A:
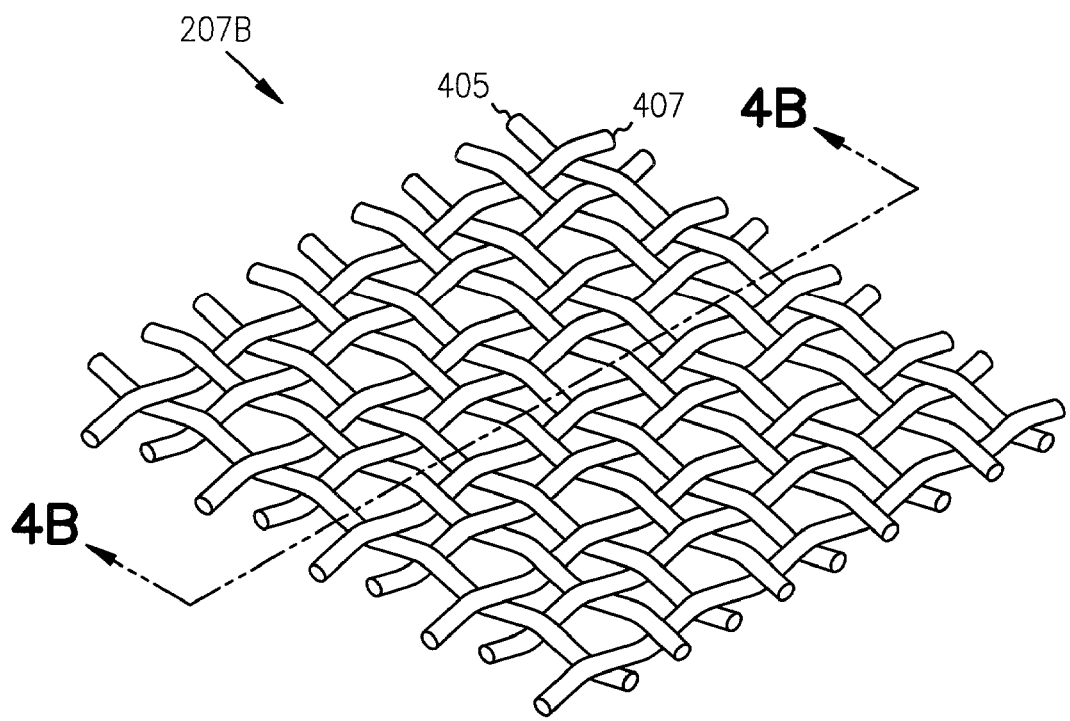
FIG. 4A is a simplified illustration of the forming surface used in the process of FIG. 2 in one aspect of the present invention.
Figure 4B:
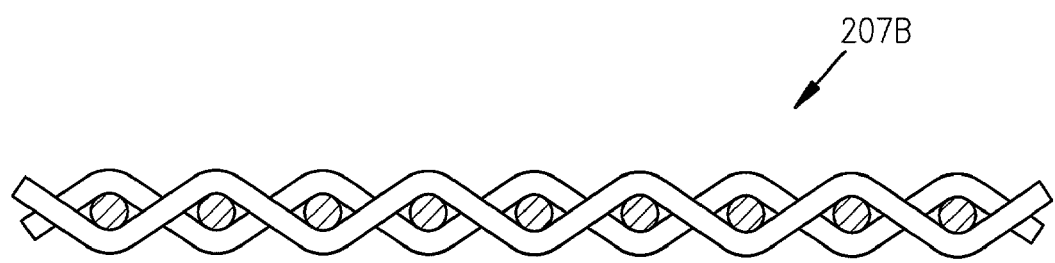
FIG. 4B shows a cross-section taken along line 4A—4A.

FIG. 4A provides one aspect of a wire configuration suitable for use with the present invention. As FIG. 4A shows, the forming surface 207B is a wire having machine direction (MD) filaments 405 and cross-machine (CM) filaments 407. FIG. 4B shows a cross-section taken along line 4A—4A. In an exemplary aspect, the forming wire is a "Formtech™ 6" wire manufactured by Albany International Co. in Albany, N.Y. Such a wire has a "mesh count" of about by eight strands per inch (about 2.4 by 3.1 strands per cm), i.e., resulting in 48 tufts per square inch (about 7.4 tufts per square cm), a warp diameter of about one (1) mm polyester, a shute diameter of about 1.07 mm polyester, a nominal air perm of approximately 41.8 $m^3$/min (1475 $ft^3$/min), a nominal caliper of about 0.2 cm (0.08 in) and an open area of approximately 51%. It is within the scope of the invention that alternate forming wires and surfaces (e.g. drums, plates, etc.) may be employed. Also, surface variations may include, but are not limited to, alternate weave patterns, alternate strand dimensions, coatings, static dissipation treatments, and the like.

Referring again to FIG. 3, the nonwoven material bank 206B on each webformer deposits the nonwoven layer 106B on top of the polymer tufted layer 108B. The nonwoven material bank 206B is comprised of first and second polymer dies 310B and 311B, respectively, and a pulp generator 312B, although the invention is not so limited. Any number of dies and pulp generators can be used to dispense any suitable amount of material. In a particular aspect, the process for forming the nonwoven layer 106B is accomplished using double web-former coform technology as described in Georger, supra.

In one aspect, the nonwoven layer 106B is produced when components from the dies 310B and 311B and the pulp generator 312B are merged under turbulent conditions to form an integrated air stream containing a thorough mixture of components. Specifically, the first and second polymer dies 310B and 311B dispense primary air streams containing melt blown microfibers. The pulp generator 312B dispenses a secondary air stream containing wood pulp fibers. The microfibers are in a soft nascent condition at an elevated temperature when they are turbulently mixed with the wood pulp fibers in air. The mixture is directed onto the polymer tufted layer 108B to form the nonwoven layer 106B. As noted above, these two layers 108B and 106B together form one of the bi-layers, e.g.,104B, of the IT wire laminate 102.

As discussed herein, the outer layers 104B and 104A provide absorbency and the surface tactile properties, such as softness, thickness, density, etc., and some of these in combination with the tufted layer. The proportions of ingredients for each outer layer do not necessarily have to be the same, but is generally considered to be what is needed to maintain integrity and still achieve the desired properties.

Figure 5:
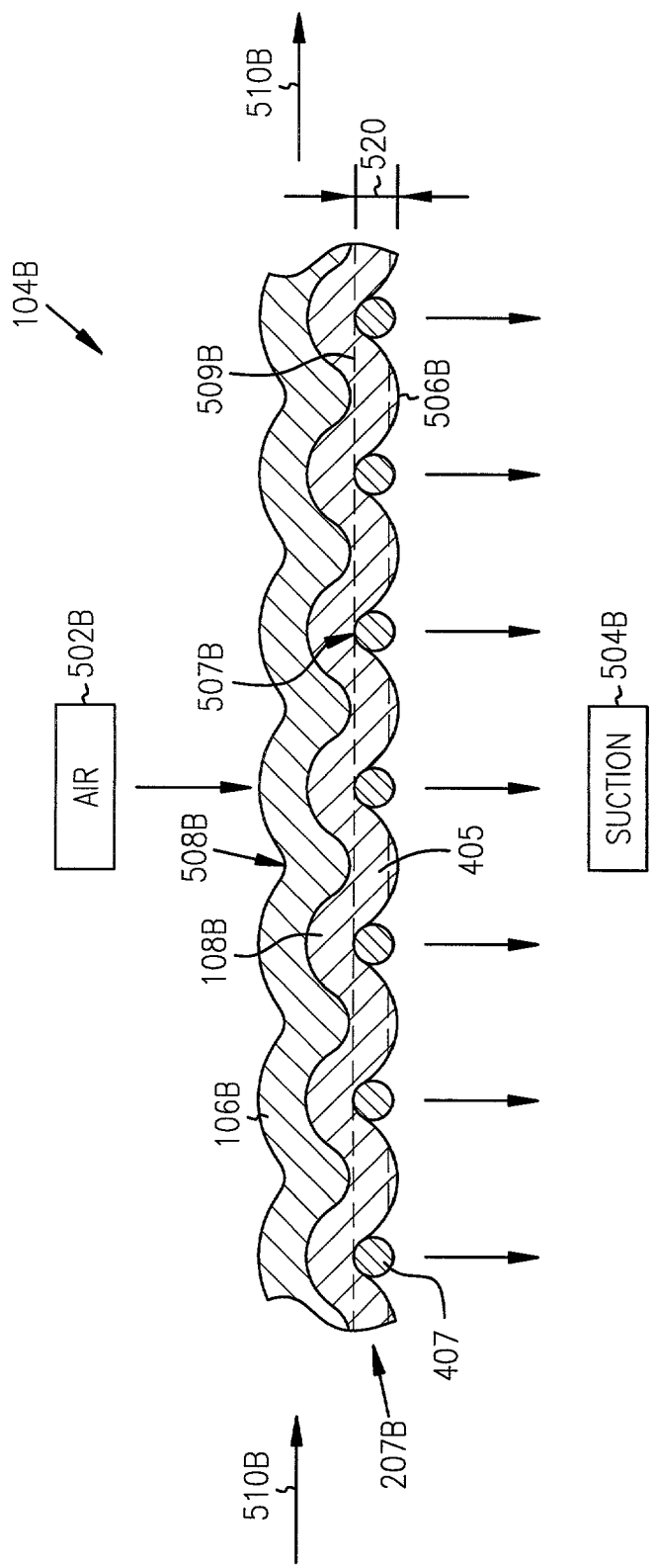
FIG. 5 is a simplified side view of one of the IT layers during the formation process of FIG. 3 in one aspect of the present invention.

FIG. 5 is a simplified side view of one of the IT bi-layers 104B during the formation process described herein. As FIG. 5 illustrates, forced air 502B containing the various components is used to place the materials on the forming surface, such as a wire, which is traveling in direction 510B. Suction 504B provided by a suitable vacuum box helps to pull the polymeric components through the forming surface 207B (having MD filaments 405 and CD filaments 407 as discussed above), thus forming tufts 506B, valleys 507B (i.e., formed by the wires) and depressions 508B. The result is an IT bi-layer 104B comprised of a polymer tufted layer 108B and a nonwoven layer 106B.

The length or height 520 of each tuft 506B is measured as the distance from the peak of the tuft 506B to a base 509B formed by the plane defined by a valley 507B surrounding the peak. This dimension is best measured after formation of the tufted layer and removal of the layer from the porous forming surface, but prior to lamination of the tufted layer with any other layer. Particularly, tuft length is best determined after removing the tufted layer from the forming surface and after allowing the layer to equilibrate to standard room temperature and humidity for about one hour, although the invention is not so limited. Under such conditions, however, and in order of increasing advantage, such dimension can be at least about one (1) mm, at least about two (2) mm, at least about three (3) mm, or between about three (3) mm and about five (5) mm.

In another aspect of the invention, the protrusions or projections that form the tufts are configured in an identifiable pattern that can advantageously be a substantially uniform pattern across the surface of the tufted layer. Without being limited to a particular theory of operation, it is believed that the distribution of the tufts can be controlled, as desired, to produce a laminate of the invention such that when there are more tufts per square area, the less steep the walls of each tuft may need to be to provide the desired resilience to the laminate and prevent collapse of the tuft under load. Stated similarly, the more steep the walls of the tufts, the less likely the tufts are to buckle or collapse under a load. As a result, the tufts can be spaced further apart and still provide the desired resilience to the laminate and prevent collapse thereof.

Referring again to FIG. 3, after each bi-layer 104A and 104B is formed, they are combined to form the IT laminate web 210. It is important that release from the forming surface be handled properly at each stage (including the wire-release for webformer 202A that occurs as the material is entering the outer rollers 213 (shown in FIG. 2). In one aspect, a coating is applied to the forming surface. This can include, but is not limited to, silicone, fluorochemical coatings, etc. In another aspect mechanical or pneumatic devices are used to aid in release. These include, but are not limited to, driven pick-off/S-wrap rolls (i.e., a roll or assembly of rolls in close proximity to the downstream edge of the forming surface which, when driven at a higher speed than the forming surface, facilitates removal from the forming surface), air knife(s) (i.e., an assembly which provides a concentrated line or blade of high velocity air from underneath the forming surface thereby pneumatically removing the web from the forming surface), or other techniques which result in release of the web from the wire. In yet another aspect, conventional bi-component meltblown can be used. In yet another aspect a sufficient amount of pulp can be added to the polymer tufted layer 108 to aid in release but not interfere with desired feature(s) of the tufted layer as taught herein (e.g., less than about 25% pulp). It should be appreciated that any combination of the above aspects can also be used, as warranted by a particular application.

The two bi-layers or facings 104A and 104B can be laminated together using normal calender embossing as described above, with the polymer tufted layers to the inside. The result is a soft product with a washcloth-like feel similar to the product described in U.S. patent application Ser. No. 09/751,329, filed on Dec. 29, 2000, entitled, "Composite Material with Cloth-Like Feel." However, unlike the material in 09/751,239, the material of the present invention does not require the use of any type of elastic material or fibers to produce the soft, tufted product, relying instead on the internally tufted orientation of the layers. As noted previously, however, elastic materials or fibers can be used in the present invention as desired.

Figure 6:
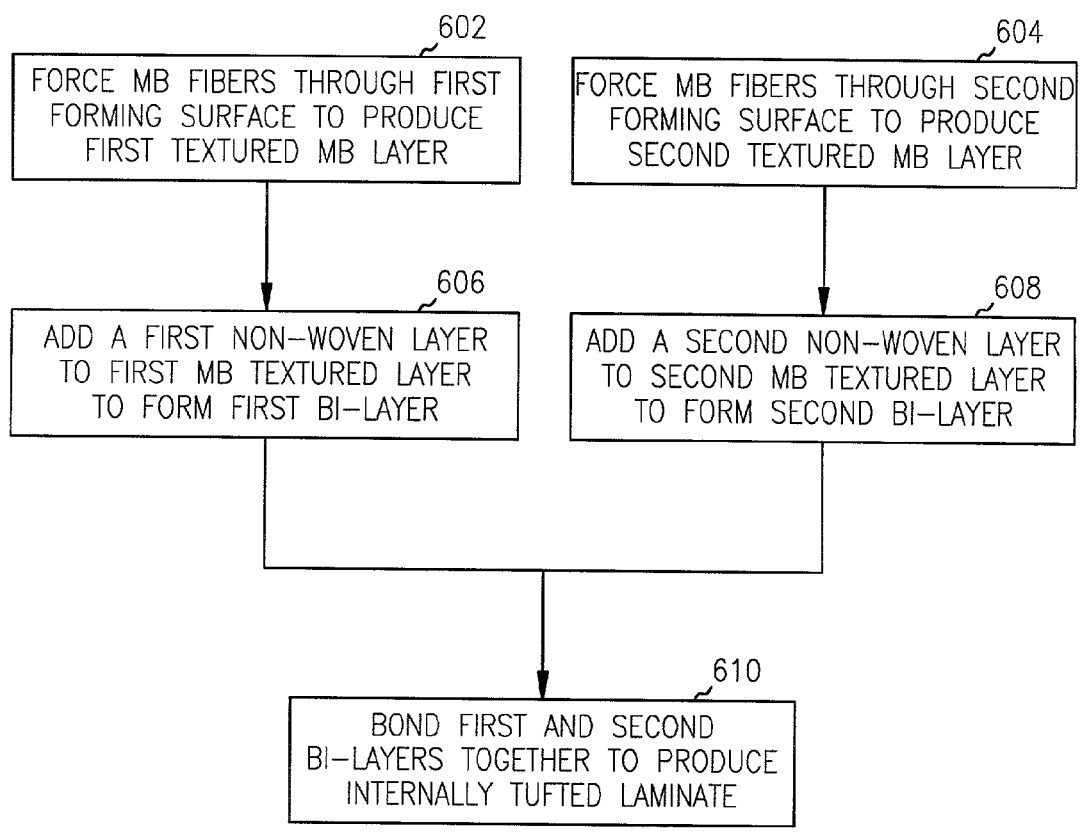
FIG. 6 is a block diagram of the process for forming an IT material in one aspect of the present invention.

The process for forming an IT laminate comprises, in one aspect, combining at least two composite tufted products. As shown in FIG. 6, the process 600 can include forcing 602 polymer fibers through a first forming surface to produce a first tufted polymer layer; forcing 604 polymer fibers through a second forming surface to produce a second tufted polymer layer; adding 606 a first nonwoven composite layer to the first tufted polymer layer to produce a first bi-layer structure; adding 608 a second nonwoven composite layer to the second tufted polymer layer to produce a second bi-layer structure; and bonding 610 the first and second bi-layer structures together with the first and second tufted polymer layers oriented to produce the IT material.

The IT laminates of the present invention, including wetted IT laminates, are soft and washcloth-like. Such a soft cloth-like feel is often characterized by many factors, including, but not limited to, thickness, bulk density, flexibility, texture, softness, density, durability, and so forth, which must be appropriately balanced. For example, when the basis weight is decreased, tensile strength is decreased and vice versa. Wetted laminates, i.e., wet wipes, of the present invention have a low density (i.e., maximum bulk per unit mass), while maintaining a high strength and tear resistance (i.e., sufficient tensile strength in both MD and CD).

The IT laminate of FIGS. 7B, 8B and 9B was prepared by the method described in Example 1 below. The control coform of FIGS. 7A, 8A and 9A was prepared by the method described in Example 4, but with a different embossing pattern and overall pulp:polymer ratio than what was used in Example 4. Specifically, the pulp:polymer ratio used for the coform seen in FIGS. 7A, 8A and 9A was the same as the IT laminate of FIGS. 7B, 8B and 9B, although the processes used and resulting products had clear differences, as taught by the invention.

Figure 7A:
FIG. 7A is a scanning electron microscope (SEM) photograph of a prior art flat (control) coform product in a dry state, taken at a 45-degree projection angle with a magnification of 30×.
Figure 7B:
FIG. 7B is a SEM photograph of an IT laminate in a dry state, taken at a 45-degree projection angle with a magnification of 30× in one aspect of the present invention.

FIGS. 7A and 7B show SEM photographs of a prior art flat (control) coform product and an IT laminate of the present invention, respectively, each in a dry state, taken at a 45-degree projection angle with magnification of 30×. The tufted nature of the present invention is clearly distinguishable in FIG. 7B from the relatively flat nature of the control coform material shown in FIG. 7A. The improved texture of the IT laminate, as depicted in FIG. 7B (as well as FIG. 8B below), serves to improve bulk, texture, and cleaning efficacy as compared to the control coform.

Figure 8A:
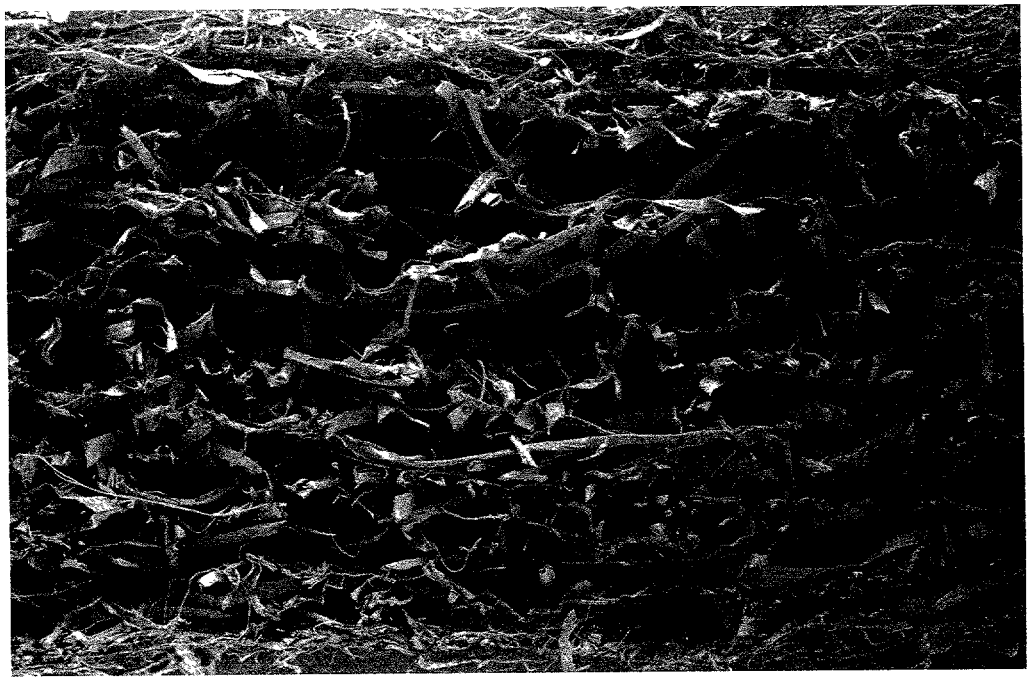
FIG. 8A is a SEM cross-section of the control coform product of FIG. 7A with a magnification of 50×.
Figure 8B:
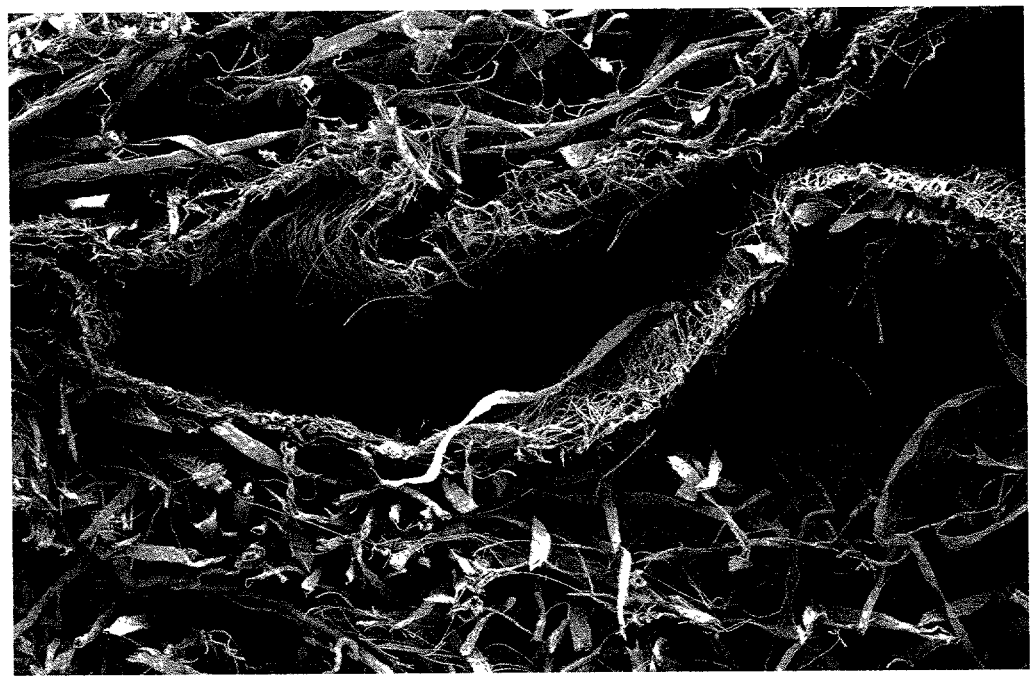
FIG. 8B is a SEM cross-section of the IT laminate of FIG. 7B with a magnification of 50× in one aspect of the present invention.

FIGS. 8A and 8B show SEM cross-sections of the dry control coform product and the dry IT laminate of FIGS. 7A and 7B, respectively, with magnification of 50×. The open high void volume core structure of the present invention as a result of the tufted meltblown layer is clearly distinguishable in FIG. 8B from the control coform material shown in FIG. 8A. The core structure of the present invention serves to increase the bulk and texture of the material in both wet and dry states and improves wetness perception upon addition of solution.

Figure 9A:
FIG. 9A is an optical top view photograph of the control coform product of FIG. 7A at an approximate solution add-on of 330% by weight.
Figure 9B:
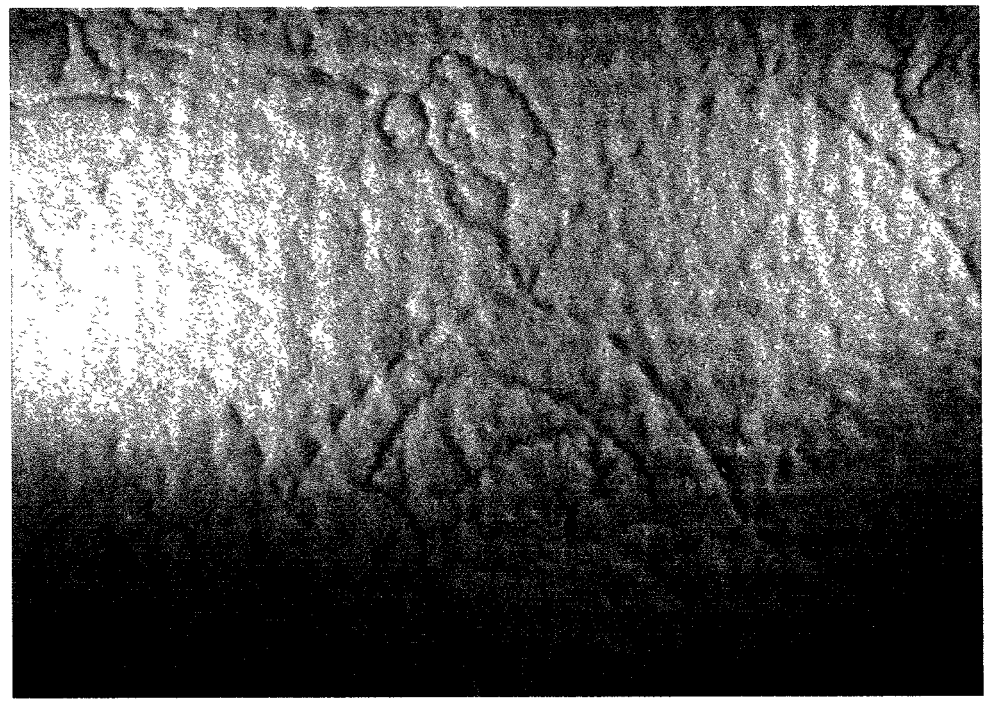
FIG. 9B is an optical top view photograph of the IT laminate of FIG. 7B at an approximate solution add-on of 330% by weight in one aspect of the present invention.

FIGS. 9A and 9B are optical top view photographs of the control coform material and the IT laminate of FIGS. 7A and 7B, respectively, at an approximate solution add-on of 330% by weight. The gentle rolling quilted texture of the present invention is clearly distinguishable in FIG. 9B from the relatively flat nature of the control coform material shown in FIG. 9A.

The products of the present invention can provide increased bulk or thickness as compared with flat nonwoven products or coform having similar basis weights. In other words, although the basis weight is the same or lower than a conventional flat coform, it is still thicker.

In one aspect, the internally tufted laminate has a basis weight of between about 60 g/m$^2$ and 80 g/m$^2$, with each bi-layer comprising about one-half the total. Each layer of the bi-layer, in turn, can comprise any suitable amount of the total. In one aspect, the tufted layer is about 15% to 25% of the total basis weight and the nonwoven layer is about 75% to 85%, respectively. In most aspects, however, the basis weight for the nonwoven layer is greater than that of the tufted layer. In a particular aspect, the internally tufted laminate has a basis weight of about 75 g/m$^2$, with each bi-layer having a total basis weight of about 37.5 g/m$^2$. The total basis weight of each bi-layer in such an aspect can be comprised of about 7.5 g/m$^2$ for the tufted layer and about 30 g/m$^2$ for the nonwoven layer. In an exemplary aspect, the 7.5 g/m$^2$ tufted layer is made from PF-015 polypropylene manufactured by Basell North America, Inc. and the 30 g/m$^2$ is coform, itself comprised of about 22.5 g/m$^2$ NF-405 pulp manufactured by Weyerhouse Corp. and about 7.5 g/m$^2$ Basell PF-015 polypropylene.

Liquid is added to the internally-tufted laminate by any means known in the art. The liquid can be any solution that can be absorbed into the wet wipe material and may include any suitable components that provide the desired wiping properties. For example, the components may include water, emollients, surfactants, fragrances, preservatives, chelating agents, pH buffers or combinations thereof as are well known to those skilled in the art. The liquid may also contain lotions and/or medicaments.

The amount of liquid contained within each wet wipe may vary depending upon the type of material being used to provide the wet wipe, the type of liquid being used, the type of container being used to store the wet wipes, and the desired end use of the wet wipe. Generally, each wet wipe can contain from about 150 to about 600 weight percent and preferably from about 250 to about 450 weight percent liquid based on the dry weight of the wipe for improved wiping. In one aspect, the amount of liquid contained within the wet wipe is from about 300 to about 400 weight percent and desirably about 330 weight percent based on the dry weight of the wet wipe. If the amount of liquid is less than the above-identified ranges, the wet wipe can be too dry and may not adequately perform. If the amount of liquid is greater than the above-identified ranges, the wet wipe can be oversaturated and soggy and the liquid may pool in the bottom of the container.

Each wet wipe can be any suitable shape and size. In one aspect the wet wipe is generally rectangular in shape and may have any suitable unfolded width and length. For example, the wet wipe may have an unfolded length of from about two (2) cm to 80 cm and, in one aspect, from about 10 cm to 25 cm and an unfolded width of from about two (2) cm to 80 cm and, in one aspect, from about ten (10) cm to 25 cm. In one aspect, each individual wet wipe is arranged in a folded configuration and stacked one on top of the other to provide a stack of wet wipes or interfolded in a configuration suitable for pop-up dispensing. Such folded configurations are well known to those skilled in the art and include c-folded, z-folded, quarter-folded configurations and the like. The stack of folded wet wipes can be placed in the interior of a container, such as a plastic tub, to provide a package of wet wipes for eventual sale to the consumer. Alternatively, the wet wipes may include a substantially continuous strip of material which has perforations between each wipe and which can be arranged in a stack or wound into a roll for dispensing.

Additionally, conventional embossing can be used, although the invention is not so limited. Embossing patterns should be chosen so as to not detract from the aesthetic cloth-like appearance of the internally tufted laminate. FIG. 10 shows a plan view of a wet wipe 1000 created according to the processes described herein with an exemplary embossing pattern. For clarity of illustration, only a few bonding points 1020 are labeled with reference numerals. The bonding points 820 are created by the bonding roller arrangement 213, 214 (FIG. 2) as the two bi-layers pass through the bonding roller arrangement. While the illustrated aspect has particular bonding points 1020, it is understood that other bonding patterns could be used to form at least two bonding points 1020. The wet wipe 1000 further has decorative outlines, here shown as various forms of teddy bears, which can form additional bonding points 1020, although the invention is not so limited.

The invention will be further described with the following non-limiting Examples:

EXAMPLE 1

An interior tufted nonwoven material facing was made in accordance with this invention using a forming wire available from Albany International under the trade designation Formtech™-6. Meitbiown fibers were formed by extruding the polymer at an extrusion temperature of about 490° F. and at a rate of about two (2) pounds/in/hour/meltblown die. The molten meitbiown fibers were attenuated in an air stream having a flow rate of approximately 7.5 standard cubic feet per minute per inch (hereinafter "scfm/in") for the tufted layer and approximately 11.25 scfm/in for the coform layer at a temperature of approximately 525° F.

Figure 11:
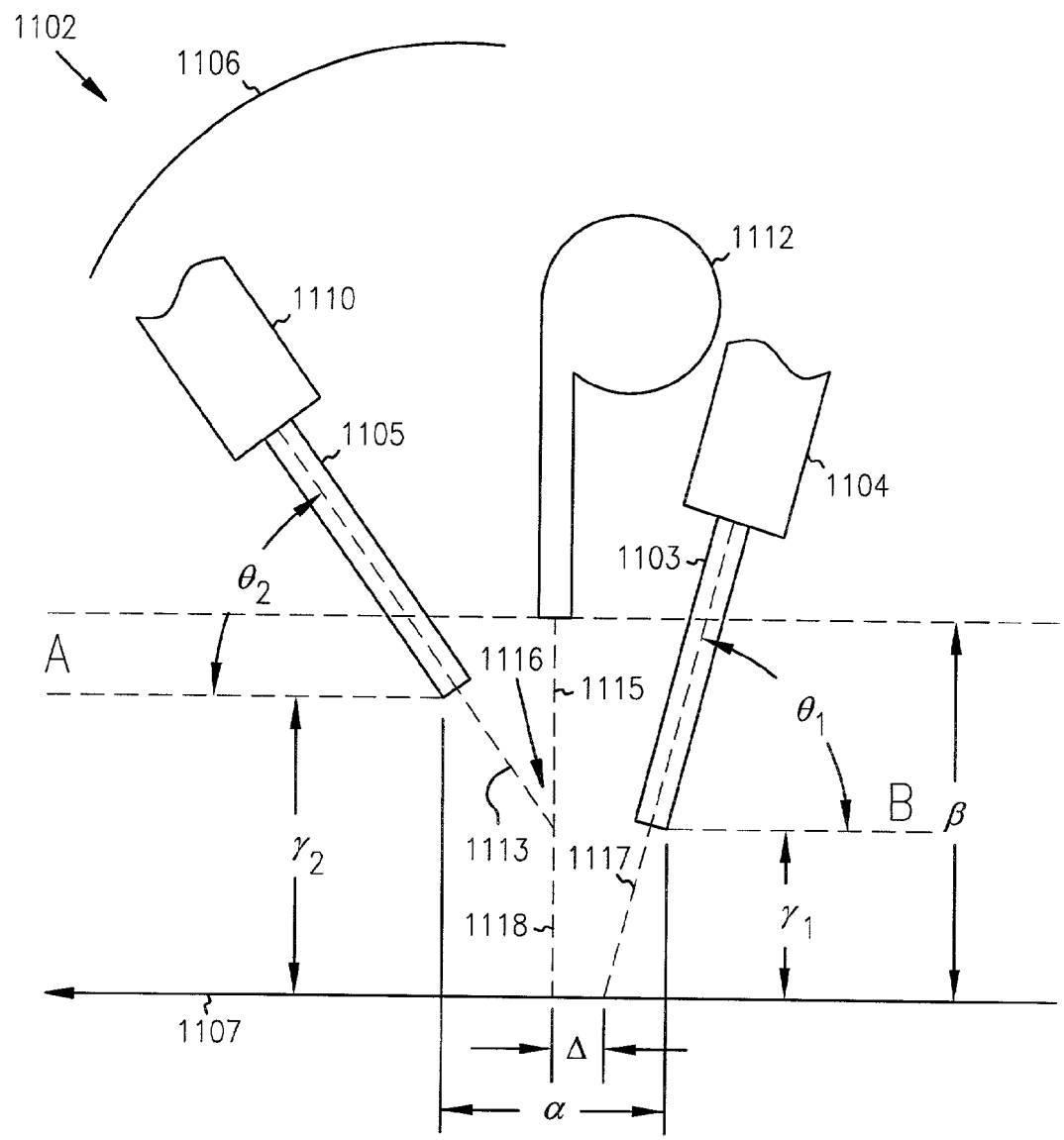
FIG. 11 is a schematic illustration showing certain features of the apparatus of FIG. 3.

Roll pulp was fiberized in a conventional picker unit. The upstream meltblown die forming the tufted layer was positioned so that its extrudate formed an essentially separate layer from the other pulp and meltblown components. FIG. 11 shows the arrangement of the components used to produce the material tested herein. In particular, FIG. 11 provides a detailed view of one exemplary embodiment of a webformer 1102, similar to the webformer 202B shown in FIG. 3. FIG. 11 essentially highlights variables that affect the type of fibrous nonwoven composite structure made. Also shown are various forming distances that affect the type of fibrous nonwoven composite structure.

As FIG. 11 shows, the webformer 1102 used in this Example is comprised of a first polymer die 1104 and a nonwoven material bank 1106. In this example, the nonwoven material bank 1106 comprises a second polymer die 1110 and a pulp generator 1112 (often referred to as a "pulp picker"). The first polymer die 1104 has a first tip 1103. The second polymer die 1110 has a second tip 1105.

The polymer dies 1104 and 1110 are mounted so they can be set at an angle. The angle for the second polymer die 1110 is measured from tangent plane "A." The angle for the first polymer die 1104 is measured from tangent plane "A." Generally speaking, each plane "A" and "B" is parallel to the forming surface (e.g., 1107). Typically, each polymer die is set at its own particular angle, $\theta_1$ and $\theta_2$, although the invention is not so limited. In another embodiment, these angles can be the same, such as is shown in FIG. 2 of Georger, supra. In the embodiment shown in FIG. 11, the second polymer die 1110 is mounted so that the streams of gas-borne filaments from it and the pulp picker 1112 (streams 1113 and 1115, respectively) intersect in a zone below plane A (i.e., the impingement zone 1116) as shown. In one embodiment, angle $\theta_1$ may range from about 45° F. to 75° F. In one embodiment angle $\theta_2$ ranges from about 40° F. to 50° F., and is generally smaller than $\theta_1$. In this example, $\theta_2=45°$ and $\theta_1=57°$.

As can be seen in the embodiment shown in FIG. 11, the stream of filaments from the first die 1104 does not intersect the stream 1115 from the pulp picker 1112, although the invention is not so limited. Instead, the microfibers 1112 impact the forming surface 1107 at a distance ($\Delta$) from the point at which the composite stream 1118 impacts the forming surface 1107. Generally speaking, distance $\Delta$ may range from about 2.5 cm to ten (10) cm. In this example, $\Delta=5$ cm. Again, alternative arrangements are possible, such as is described in Georger, supra. By keeping the stream of filaments 1117 separate, however, the percentage of polymer in the tufted layer can be increased as desired.

The two polymer die tips 1103 and 1105 are separated by distance a. Generally speaking, distance a may range from about ten (10) cm to 40 cm. In this example, $\alpha=21.25$ cm. In some embodiments this distance may be set even greater in order to produce a lofty, bulky material that may be somewhat weaker and less coherent than materials produced at shorter distances.

Generally speaking, the dispersion of the composite stream 1118 may be minimized by selecting a proper vertical forming distance ($\gamma_2$). A shorter vertical forming distance is generally desirable for minimizing dispersion. This must be balanced by the need for extruded fibers to solidify from their tacky, semi-molten state before contacting the forming surface 1107. For example, the vertical forming distance $\gamma_2$ may range from about ten (10) cm to 25 cm, as measured from the end of the second die tip 1105 to the forming surface 1107. This distance may be set even greater to produce a lofty, bulky material that is somewhat weaker and less coherent than materials produced at shorter distances. In this example, $\gamma_2=21.25$ cm.

Vertical forming distance ($\gamma_1$), as measured from the end of the first polymer die tip 1103 may range from about ten (10) cm to 40 cm, but is generally smaller than $\gamma_2$. In this example, $\gamma_1=15$ cm.

Distance ($\beta$) from the end of the pulp picker 1112 to the forming surface 1107 may range from about 7.5 cm to 37.5 cm. Varying this dimension results in different conventional optimizations of the material as desired. In this example, $\beta=31.25$ cm.

Gas entrained secondary fibers are introduced into the impingement zone 1116 via the stream 1115 from the pulp generator 1112. Generally speaking, the pulp generator 1112 is positioned so that its vertical axis is substantially perpendicular to planes A and B. In some situations, it may be desirable to cool the secondary stream 1115. Cooling the secondary air stream could accelerate the quenching of the molten or tacky meltblown fibers and provide for shorter distances between the polymer die tips and the forming surface, which could be used to minimize fiber dispersion and enhance the gradient distribution of the composite structure. For example, the temperature of the secondary air stream 1115 may be cooled to about 15° F. to about 85° F. Other considerations as to the arrangements described herein are outlined in Georger, supra.

By first providing a first layer of polymer-only textured filaments 1117 from the first polymer die 1104 prior to adding a layer formed by the composite stream 1118, together with balancing the various angles and distances noted herein, it is now possible to produce a fibrous nonwoven composite structure having the properties as described herein.

Sufficient below-wire-vacuum of about 15-inch water gauge in the forming zone was employed to adequately draw the meltblown filaments and wood pulp into the wire. The tufts produced measured approximately 0.125 in, as measured from the base to the top of each tufts.

The fiberized wood pulp was a mixture of about 80%, by weight, bleached softwood kraft pulp and about 20%, by weight, bleached hardwood kraft available from Weyerhauser Corporation under the trade designation NF-405. The polypropylene meltblown was available from Basell under the trade designation PF-015. The material was targeted to have an overall pulp-to-polymer weight ratio of about 60:40 and to have an overall basis weight of approximately 37.5 gsm. With this construction, the outer coform layer had a pulp-to-polymer ratio of approximately 75:25. The meltblown portion of this sample was equally divided between the tufted component and the coform component. To ensure the correct ratio and overall basis weight, individual components of the fabric were produced and weighed separately.

Two identical 37.5 gsm facing materials were then laminated together so as to produce a 75 gsm total laminate of interior wire-texture using a heated nip of a patterned bond roller and a smooth anvil roller. The patterned roller used was engraved to the "T-Quilt" pattern as depicted in FIG. 10. See, for example, U.S. Pat. No. D 418,305. Lamination was conducted at about 230° F. for the patterned roller and at about 210° F. for the anvil roller at a nip pressure of about 20 psi for hydraulic cylinder pressure. It is noted that other hydraulic cylinder pressures can be used and one of ordinary skill in the art would know the appropriate amount of nip pressure, under a given set of circumstances, to cause desired bonding between layers of the laminate.

The wetting solution used in these Examples is a known commercial solution used in the product HUGGIES® Supreme Care brand baby wipes manufactured by the Assignee of the present invention, Kimberly-Clark Corporation in Neenah, Wis. The solution was added to the material at an approximate add-on of 330% by weight.

Characteristic data of the material in Example 1 appears in Table 1 below.

EXAMPLE 2

Example 2 was produced according to the procedures and processing conditions of Example 1 with the following differences: 35 gsm basis weight was targeted, the meltblown extrusion rate was approximately three (3) lbs/inch/hour/meltblown die, the molten meltblown fibers were attenuated in an airstream having a flow rate of approximately 15 scfm/in for the tufted layer and approximately 22.5 scfm/in for the coform layer at a temperature of approximately 525° F. The forming geometry was configured according to FIG. 11, with the following approximate values: $\alpha=9$ in, $\theta_1=55°$, $\theta_2=45°$, $\beta=12$ in, $\gamma_1=5$ in, $\gamma_2=9.5$ in. (As noted above, the same type and amount of solution as in Example 1 was used).

Characteristic data of the material in Example 2 appears in Table 2.

EXAMPLE 3

Example 3 was produced according to the procedure of Example 1 with several important differences. The meltblown tufted layer was comprised of side-by-side bicomponent fibers in which the components were Basell PF-015 polypropylene and Dow ASPUN™ 6806A linear-low-density polyethylene, available from the Dow Chemical Corporation of Midland, Mich. The PP:PE ratio of these bicomponent fibers was 75:25 by weight. Polypropylene was utilized as the meltblown component of the coform side.

Other differences from the procedure of Example 1 are: 42.5 gsm basis weight was targeted, the meltblown extrusion rate was approximately three (3) lbs/inch/hour/die for the tufted layer and 2.5 pounds/inch/hour for the coform layer, the molten meltblown fibers were attenuated in an airstream having a flow rate of approximately 18.8 scfm/in for both meltblown components. The forming geometry was configured according to FIG. 11, with the following approximate values: $\alpha=7$ in, $\theta_1=57°$, $\theta_2=45°$, $\beta=11$ in, $\gamma_1=4.5$ in, $\gamma_2=4.5$ in. (As noted above, the same type and amount of solution as in Example 1 was used).

Characteristic data of the material in Example 3 appears in Table 1 below.

EXAMPLE 4

The comparative example having the characteristics as shown in Table 1 below, was produced in accordance with Georger, supra, using the same raw materials as in Examples 1 and 2. A single integrated pulp and polymer composite layer of 70 gsm traditional un-tufted coform was produced at an overall pulp-to-polymer ratio of 68:32, by weight. The meltblown extrusion rate was about three (3) lbs/in/hour/meltblown die at an approximate extrusion temperature of 500° F. The meltblown fibers were attenuated in an airstream having a flow rate of approximately 22.5 scfm/in for both meltblown fiber streams and at a temperature of about 525° F. The forming geometry was configured according to FIG. 11 with the following approximate values: $\alpha=7$ in, $\theta_1=45°$, $\theta_2=45°$, $\beta=12$ in, $\gamma_1=10$ in, $\gamma_2=10.5$ in.

The material was bonded using a pattern identical to that found in the product HUGGIES® Natural Care brand baby wipes manufactured by the Assignee of the present invention, Kimberly-Clark Corporation in Neenah, Wis., with similar process conditions to Examples 1 and 2. The wetting solution used in these Examples is a known commercial solution used in the product HUGGIES® Natural Care brand baby wipes, also manufactured by Kimberly-Clark Corporation. The solution was added to the material at an approximate add-on of 330% by weight.

Characteristic data of the material in Example 4 appears in Table 1 below.

TABLE 1

Comparative Data

| Test | Unit | Example 1 | Example 2 | Example 3 | Control Comparative Example 4 |
|---|---|---|---|---|---|
| Basis Weight | gsm (dry) | 78 | 68 | 87 | 72 |
| Bulk | mm (wet) | 0.82 | 0.8 | 1.01 | 0.7 |
| Cup Crush | g-mm (wet) | 1780 | 1392 | 877 | 1560 |
| CD Tensile Load | lb/in | 1.22 | 0.8 | 0.82 | 0.7 |
| CD Tensile Elongation | % | 65 | 65 | 78 | 65.9 |
| CD Tensile (Total Energy Absorbed) TEA | ft lbs/sq in | n/a | 2.7 | 3.4 | 2.4 |
| MD Tensile Load | lb/in | 1.33 | 1.4 | 1.28 | 1.4 |
| MD Tensile Elongation | % | 28 | 33 | 43 | 21.5 |
| MD Tensile TEA | ft lbs/sq in | n/a | 2.5 | 3.4 | 2 |

TABLE 1-continued

Comparative Data

| Test | Unit | Example 1 | Example 2 | Example 3 | Control Comparative Example 4 |
|---|---|---|---|---|---|
| Wet Density | g/cc | 0.095 | 0.085 | 0.086 | 0.103 |
| Cup Crush/Density | cm$^4$ | 1871 | 1638 | 1018 | 1517 |

The products of the present invention are suitable for any number of disposable products, including, but not limited to, disposable diapers, disposable tissues, disposable towels, disposable wipes (e.g., disposable wet wipes), and so forth. Without being limited to a particular theory of operation, it is believed that the center or inner layers of the product can provide a resilient core with an open pore structure, which resists collapse when wetted. Therefore, any pressure that is applied to the product through use can cause the solution to easily migrate to the surface to which the product is being applied, such as skin. As a result, there can be an increased "wetness" perception with this product.

Further in this regard, the nonwoven materials described herein are also believed to have excellent wicking qualities, such that an outer surface of a wetted laminate can feel dry, even though the laminate may contain a large amount of moisture. By locating the polymer tufted material to the inside, as in the present invention, the moisture can be wicked instead towards the outside, resulting in increased moisture on the surface. As a result, wetted laminates of the present invention can also have improved cleaning ability as compared with conventional nonwoven products, in that more deposits can be picked up with a given-sized laminate.

As noted herein, the tufted layers of the present invention are oriented in a manner contrary to teaching in the art. By placing the tufts of the polymer tufted layer(s) to the inside, as in the present invention, without being limited to a particular theory of operation it is believed that a cushioned fabric is created that provides resiliency, while still maintaining perceived good texture from the outside without any added roughness. The tufts, which exhibit a female-only pattern on the outer surfaces (i.e., opposite the tuft peaks), further provide absorbency and a vehicle for moisture distribution and migration towards these surfaces. The IT laminate material of the present invention is highly effective and economical, while maintaining a soft washcloth-like feel with a soft, gently-rolling external texture.

The inventors have further discovered surprising results can be provided by the combination of an internally tufted layer of fibers having strength and resilience greater than that of fibers of at least one outer layer of material surrounding the IT layer. For example, such a relationship of fibers (e.g., meltblown polymer fibers for the IT layer(s) and coform fibers for the outer layer(s)) can enable the IT layer to better maintain its structure as formed when compared to the structural integrity of the outer layer. In another aspect, such a relationship can enable a laminate with a strength-providing core surrounded by softer outer layers. Still further, such a combination can enable the outer layer(s) of the IT laminate to collapse onto the IT layer(s), when the laminate is subject to compression forces and/or wetted with a solution or liquid, providing the laminate with a soft outer texture and yet having durability, resilience and flexibility from within the laminate.

All publications, patents, and patent documents cited in the specification are incorporated by reference herein, as though individually incorporated by reference. In the case of any inconsistencies, the present disclosure, including any definitions therein will prevail. The laboratory conditions under which testing was performed generally adhere to ASTM E 171, "Standard Atmospheres for Conditioning and Testing Materials", as well as 21 CFR 58.61–63, "Good laboratory practices for nonclinical laboratory studies" and CFR 211.160(b)(4), "Current Good Manufacturing Practices for Finished Pharmaceuticals."

Although specific aspects have been illustrated and described herein, it will be appreciated by those of ordinary skill in the art that any arrangement that is calculated to achieve the same purpose may be substituted for the specific aspect shown. This application is intended to cover any adaptations or variations of the present invention. Therefore, it is manifestly intended that this invention be limited only by the claims and the equivalents thereof.

We claim:

1. A nonwoven laminate comprising two layers of material, each layer having a plurality of projections, each projection surrounded by a valley, wherein the plurality of projections are configured to form an identifiable pattern and are oriented towards each other to produce a laminate in which opposing projections are in contact and at least some of the opposing projections are bondable to one another, wherein opposing valleys form a void volume between the two layers of material and the nonwoven laminate does not contain elastic materials or fibers between the two layers of material.

2. The laminate of claim 1 wherein at least one of the two layers of material has a bi-layer structure.

3. The laminate of claim 2 comprising two bi-layer structures, wherein each bi-layer structure comprises a layer of the material and an outer layer of nonwoven composite material.

4. The laminate of claim 3 wherein the nonwoven composite material is coform.

5. The laminate of claim 4 wherein the material is comprised primarily of meltblown polymer.

6. The laminate of claim 5 wherein the meitbiown polymer is a polyolefin selected from the group consisting of polypropylene, polyethylene polybutylene, copolymers, and mixtures and blends thereof.

7. The laminate of claim 1 wherein the two layers of material are thermally bonded.

8. The laminate of claim 1 wherein the two layers of material are located between two outer layers of nonwoven material.

9. An absorbent sheet comprising: a laminate having at least two layers of material located between at least two outer layers, the at least two layers of material having opposing bondable individual projections oriented inwardly and configured to form an identifiable pattern, wherein a valley surrounds each of the individual projections and opposing valleys form a void volume between the at least two layers of material, wherein the absorbent sheet does not contain elastic materials or fibers between the at least two outer layers; and an added liquid to provide suitable wiping properties.

10. The absorbent sheet of claim 9 wherein the added liquid is selected from the group consisting of water, emollients, surfactants, fragrances, preservatives, chelating agents, pH buffers and combinations thereof.

11. The absorbent sheet of claim 10 further comprising additives selected from the group consisting of lotions, medicaments, and combinations thereof.

12. The absorbent sheet of claim 9 wherein the absorbent sheet is a personal care wet wipe.

13. The absorbent sheet of claim 10 wherein the sheet is disposable.

14. The absorbent sheet of claim 9 wherein each individual projection measures between about three (3) mm and about five (5) mm in length.

15. The absorbent sheet of claim 9 wherein each individual projection measures at least about one (1) mm in length.

16. The absorbent sheet of claim 9 wherein each individual projection measures at least about two (2) mm in length.

17. The absorbent sheet of claim 9 wherein each individual projection measures at least about three (3) mm in length.

18. The absorbent sheet of claim 9 wherein the identifiable pattern is substantially uniform.

19. The absorbent sheet of claim 9 wherein an additional elastic or non-elastic layer is located adjacent to the at least two outer layers.

20. The absorbent sheet of claim 9 wherein the opposing projections are in contact with each other.

21. An absorbent sheet comprising: a laminate comprised of a plurality of individual projections located on at least two layers of material and configured to have an identifiable pattern, wherein each individual projection is bondable and surrounded by a valley and oriented inwardly towards an opposing projection, wherein opposing valleys form a void volume between the at least two layers and each projection measuresat least about one (1) mm in length; and an added liquid to provide suitable wiping properties.

22. The absorbent sheet of claim 21 wherein each individual projection measures at least about two (2) mm in length.

23. The absorbent sheet of claim 21 wherein each individual projection measures at least about three (3) mm in length.

24. The absorbent sheet of claim 21 wherein each individual projection measures between about three (3) mm and about five (5) mm in length.

25. The absorbent sheet of claim 21 wherein the identifiable pattern is substantially uniform.

26. The absorbent sheet of claim 21 wherein the opposing projections are in contact with each other.

27. The absorbent sheet of claim 21 wherein the at least two layers of material are inner layers located between at least two outer layers.

* * * * *